(12) United States Patent
Azuma et al.

(10) Patent No.: US 8,319,835 B2
(45) Date of Patent: Nov. 27, 2012

(54) IMAGE TRANSFER SYSTEM FOR A NETWORK

(75) Inventors: Seiichi Azuma, Wuxi (CN); Takeshi Shinohara, Chofu (JP)

(73) Assignee: Nikon Corporation, Tokyo (JP)

( * ) Notice: Subject to any disclaimer, the term of this patent is extended or adjusted under 35 U.S.C. 154(b) by 391 days.

(21) Appl. No.: 12/312,463

(22) PCT Filed: Dec. 20, 2007

(86) PCT No.: PCT/JP2007/074535
§ 371 (c)(1),
(2), (4) Date: May 12, 2009

(87) PCT Pub. No.: WO2008/081736
PCT Pub. Date: Jul. 10, 2008

(65) Prior Publication Data
US 2010/0066839 A1 Mar. 18, 2010

(30) Foreign Application Priority Data

Dec. 28, 2006 (JP) .................................. 2006-355915

(51) Int. Cl.
*H04N 5/225* (2006.01)
(52) U.S. Cl. ............ 348/207.1; 709/227; 726/4; 726/28
(58) Field of Classification Search ............... 348/207.1; 709/227; 726/4, 28
See application file for complete search history.

(56) References Cited

U.S. PATENT DOCUMENTS

| | | | | |
|---|---|---|---|---|
| 7,117,519 B1 * | 10/2006 | Anderson et al. | ............. | 725/105 |
| 7,222,363 B2 * | 5/2007 | Rice et al. | .......................... | 726/5 |
| 7,551,913 B1 * | 6/2009 | Chien | ............................ | 455/411 |
| 2002/0060736 A1 * | 5/2002 | Wakao et al. | .................. | 348/207 |
| 2004/0090528 A1 | 5/2004 | Miyamoto | | |
| 2004/0193712 A1 * | 9/2004 | Benenati et al. | ............... | 709/225 |
| 2004/0252203 A1 * | 12/2004 | Kitajima | ..................... | 348/222.1 |
| 2005/0213147 A1 * | 9/2005 | Minatogawa | ................. | 358/1.15 |
| 2006/0044407 A1 * | 3/2006 | Barbeau | ....................... | 348/211.3 |
| 2006/0264202 A1 * | 11/2006 | Hagmeier et al. | ............. | 455/411 |
| 2007/0049258 A1 * | 3/2007 | Thibeault | ................... | 455/414.1 |

FOREIGN PATENT DOCUMENTS

| | | |
|---|---|---|
| JP | A-2003-78798 | 3/2003 |
| JP | A-2004-164098 | 6/2004 |
| JP | A-2006-113877 | 4/2006 |
| JP | A-2006-115024 | 4/2006 |
| JP | A-2006-157517 | 6/2006 |
| WO | WO 2005/119438 A1 | 12/2005 |

OTHER PUBLICATIONS

Notification of Reasons for Refusal issued in Japanese Patent Application No. 2006-355915, mailed Oct. 4, 2011, with English language translation.
Fujita; "Machikado o Office ni Kaeru Hot Spot Service Model o Mosaku suru Jigyosha, Kigyo Net Renkei Nerau Kiki Vendor;" *Telecommunication*; Sep. 25, 2002; pp. 26-36; vol. 19; No. 10.

* cited by examiner

*Primary Examiner* — Sinh Tran
*Assistant Examiner* — Paul Berardesca
(74) *Attorney, Agent, or Firm* — Oliff & Berridge, PLC

(57) ABSTRACT

An electronic camera having a function of accessing a specific server via Internet includes: a storage unit in which related information concerning the electronic camera is stored in advance; a generation unit that dynamically generates an identifier to be used to identify the electronic camera in conformance to a predefined specific rule based upon at least part of the related information stored in the storage unit; and a setting unit that sets the identifier generated by the generation unit within a request message to be transmitted to the Internet.

14 Claims, 22 Drawing Sheets

FIG.5

REQUEST MESSAGE

HEADER

<User Agent>
niko/ver.1/S100C/0025

... ... ...

BODY

FIG.8

AUTHENTICATION REQUEST MESSAGE

HEADER

... ... ...

... ... ...

BODY

USER ID : S100C0025@niko

PASSWORD : 015723...

AUTHENTICATION LIST

| USER ID | PASSWORD |
|---|---|
| S100C0025@niko | 015723··· |
| S100C0026@niko | 2527··· ··· |
| S100C0027@niko | 3525··· ··· |
| ⋮ | ⋮ |

FIG.12

RESTRICTION LIST

| USER ID | EXPIRY | URL |
|---|---|---|
| S100C0025@niko | 070131 | http://www.··· |
| S100C0026@niko | 070228 | http://www.··· |
| S100C0027@niko | 070601 | http://www.··· |
| ⋮ | ⋮ | ⋮ |

FIG.15

DISPLAY MESSAGE LIST

| CODE | DISPLAY MESSAGE |
|---|---|
| ⋮ | |
| 300 | ··· "PLEASE REGISTER AS A NEW USER ···" |
| ⋮ | |

IMAGE TRANSFER SYSTEM FOR A NETWORK

TECHNICAL FIELD

The present invention relates to an electronic camera equipped with a function of photographing an image and transferring the image to a server via the Internet.

BACKGROUND ART

An online album service known in the related art allows a photographer, a friend or a third party to view online an image (photograph) initially taken by the photographer with a digital camera or the like and uploaded to an image management server via a personal computer connected to the Internet, by accessing the server from a personal computer or the like.

In addition, a technology whereby an image photographed with a camera equipped with a wireless LAN function is transferred to a personal computer at home or the like from the field via an access point such as a "hot-spot" (see, for instance, patent reference 1). This technology allows the user to directly upload the image from the camera to the image management server.
Patent reference 1: Japanese Laid Open Patent Publication No. 2006-115024

DISCLOSURE OF THE INVENTION

Problems to be Solved by the Invention

While communication between the camera and the image management server is carried out in compliance with a standard protocol such as the HTTP (hypertext transfer protocol), the server is not capable of determining whether or not the camera is a service subscriber camera.

In addition, a user wishing to use wireless LAN access points must sign a separate contract with the ISP (Internet Service Provider) for each wireless LAN, obtain a user ID and password and manually set the user ID and password in the camera by performing a specific procedure.

However, errors tend to occur when manually setting the user ID and password in the camera memory, which is a complicated and laborious procedure.

Means for Solving the Problems

According to the 1st aspect of the present invention, an electronic camera having a function of accessing a specific server via Internet comprises: a storage unit in which related information concerning the electronic camera is stored in advance; a generation unit that dynamically generates an identifier to be used to identify the electronic camera in conformance to a predefined specific rule based upon at least part of the related information stored in the storage unit; and a setting unit that sets the identifier generated by the generation unit within a request message to be transmitted to the Internet.

According to the 2nd aspect of the present invention, in the electronic camera according to according to the 1st aspect, provided that the server offers a service set in correspondence to a user of each electronic camera, the identifier is identification information used by the server to identify the electronic camera of the user as a specific device.

According to the 3rd aspect of the present invention, in the electronic camera according to the 2nd aspect, provided that the server is an image management server where images are stored, the electronic camera includes a display unit that outputs a screen display in which an image to be transferred to the server is selected.

According to the 4th aspect of the present invention, the electronic camera according to the 2nd aspect or the 3rd aspect further comprises a communication unit engaged in wireless communication with an access point in a wireless LAN, and the electronic camera is connected to the Internet via the access point in communication with the communication unit.

According to the 5th aspect of the present invention, in the electronic camera according to any one of the 2nd through 4th aspects, the related information includes manufacturer information indicating a manufacturer of the electronic camera, product information of the electronic camera and a serial number assigned to the electronic camera.

According to the 6th aspect of the present invention, in the electronic camera according to the 5th aspect, the identification information generated by the generation unit includes information obtained through a specific type of encryption processing executed on at least part of the manufacturer information, the product information and the serial number appended with a predetermined specific key.

According to the 7th aspect of the present invention, in the electronic camera according to the 6th aspect, the encryption processing is executed by using a specific hash function.

According to the 8th aspect of the present invention, in the electronic camera according to any one of the 2nd through 7th aspects the identification information is written within the request message as a "User Agent" defined in HTTP.

According to the 9th aspect of the present invention, in the electronic camera according to the 1st aspect, the identifier used when accessing a service server offering a specific service after undergoing an authentication process at the server is constituted with a user ID and a password used in the authentication process at the server.

According to the 10th through 12th aspects of the present invention, the electronic camera achieved in the 9th aspect of the present invention may adopt a structure similar to that of any of the electronic cameras in the 3rd through 5th aspects, provided that the service server is an image management server where images are stored.

According to the 13th aspect of the present invention, in the electronic camera according to the 12th aspect, the generation unit generates the user ID based upon at least part of the manufacturer information, the product information and the serial number and generates the password constituted with information generated through a specific type of encryption processing executed on at least part of the manufacturer information, the product information and the serial number appended with a predetermined specific key.

According to the 14th aspect of the present invention, the electronic camera achieved in the 13th aspect may adopt a structure similar to that of the electronic camera in the 7th aspect.

According to the 15th aspect of the present invention, in the electronic camera according to any one of the 9th through 14th aspects, the user ID and the password are written in the request message in conformance to international roaming standard WISPr.

Advantageous Effect of the Invention

The present invention enables the server to make a decision as to whether or not a camera accessing the server is a service subscriber camera without requiring any identifier setting operation.

BEST MODE FOR CARRYING OUT THE INVENTION (Overall Configuration of the Image Transfer System)

Figure 1:
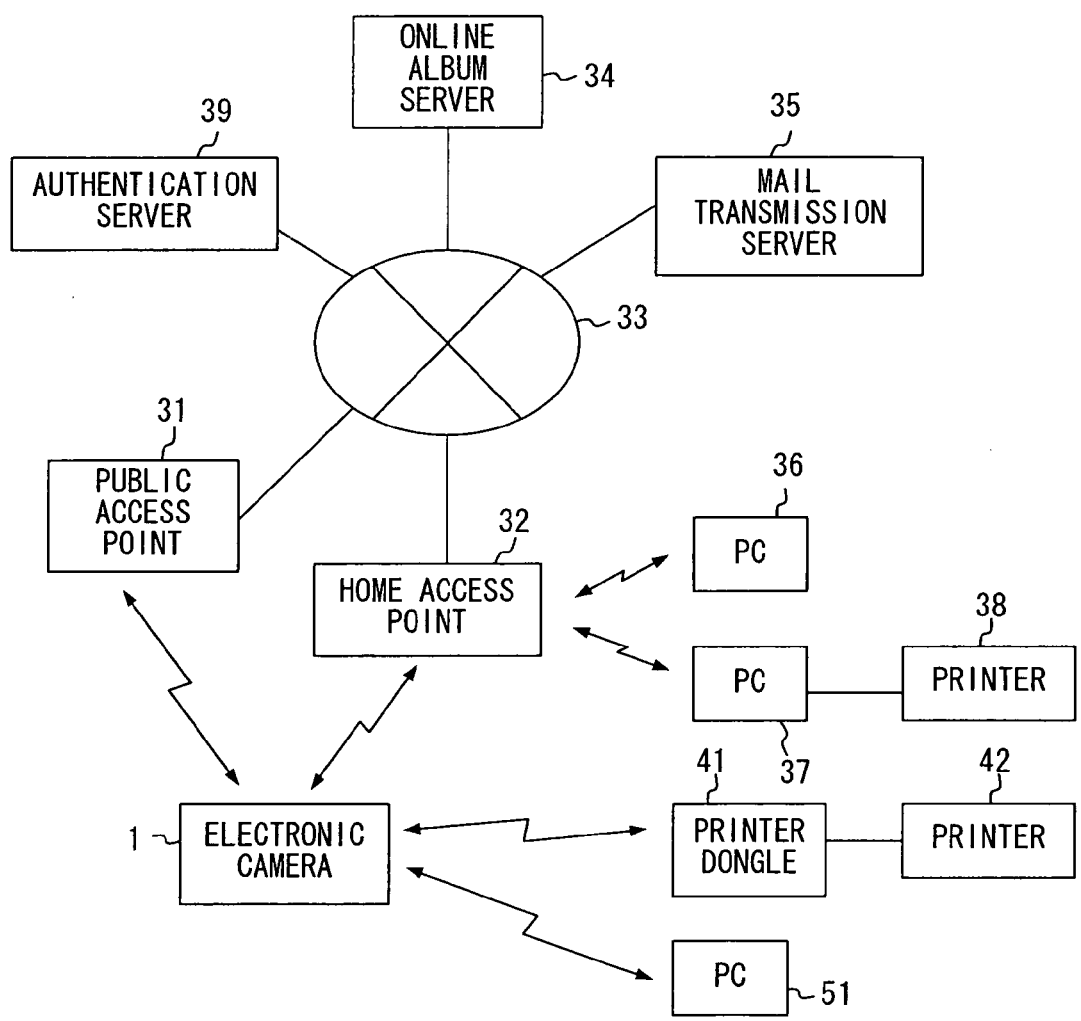
FIG. 1 The overall configuration of the image transfer system achieved in an embodiment of the present invention FIG. 2 A block diagram showing the structure adopted in the electronic camera achieved in the embodiment of the present invention FIG. 3 A block diagram showing the essential structure of the control unit engaged in identification information generation at the electronic camera achieved in the embodiment of the present invention FIG. 4 A flowchart of the identification information generation processing executed by the control unit in the electronic camera achieved in the embodiment of the present invention FIG. 5 A schematic illustration of a request message that may be transmitted to the Internet from the electronic camera in the embodiment of the present invention FIG. 6 A block diagram showing the essential structure of the control unit engaged in user ID/password generation at the electronic camera achieved in the embodiment of the present invention FIG. 7 A flowchart of the user ID/password generation processing executed by the control unit in the electronic camera in the embodiment of the present invention FIG. 8 A schematic illustration of an authentication request message that may be transmitted to the Internet from the electronic camera in the embodiment of the present invention FIG. 9 A block diagram showing the essential structure adopted in the control unit of the authentication server in the embodiment of the present invention FIG. 10 A flowchart of the authentication processing executed by the control unit in the authentication server in the embodiment of the present invention FIG. 11 An authentication list that may be stored at the authentication server in the embodiment of the present invention FIG. 12 A restriction list that may be stored at the authentication server in the embodiment of the present invention FIG. 13 A block diagram showing the essential structure of the control unit engaged in display of a message corresponding to an error code at the electronic camera in the embodiment of the present invention FIG. 14 A flowchart of the message display processing executed by the control unit in the electronic camera in the embodiment of the present invention FIG. 15 A display message list that may be stored at the electronic camera in the embodiment of the present invention FIG. 16 A flowchart of the processing executed to transfer an image by connecting the electronic camera in the embodiment of the present invention to a specific recipient through a wireless LAN connection FIG. 17 A flowchart of the online album server transfer processing executed to transfer an image to the online album server achieved in the embodiment of the present invention FIG. 18 A flowchart of the image transfer processing executed to transfer an image from the electronic camera in the embodiment of the present invention FIG. 19 A flowchart of the mail transmission server transfer processing executed when transferring an image to the mail transmission server achieved in the embodiment of the present invention FIG. 20 A flowchart of the transfer resume processing executed to resume image transfer from the electronic camera in the embodiment of the present invention FIG. 21 A flowchart of the processing executed at the online album server when transferring an image originating from the electronic camera to the online album server in the embodiment of the present invention FIG. 22 A flowchart of the processing executed at the mail transmission server when transferring an image originating from the electronic camera to the mail transmission server in the embodiment of the present invention

FIG. 1 schematically illustrates the configuration of the image transfer system achieved in an embodiment of the present invention. An electronic still camera with a wireless LAN connection capability (hereafter simply referred to as an electronic camera) 1 is connected through a wireless LAN connection with a public access point 31, a home access point 32, and a printer dongle 41 or a PC (personal computer) 51. While the wireless LAN connection with the public access point 31 and the home access point 32 is achieved in a so-called infrastructure mode, the wireless LAN connection with the printer dongle 41 and the PC 51 is achieved in a mode referred to as an ad hoc mode. The public access point 31 and the home access point 32 are connected with the Internet 33. An online album server 34 and a mail transmission server 35 are connected to the Internet 33.

In addition, an authentication server 39 managed by an ISP (Internet service provider) that provides the public access point 31 is connected to the Internet 33. It is to be noted that the public access point 31 may be provided by another ISP or an access point provider instead of by the aforementioned ISP. Accordingly, the communication between the public access point 31 and the authentication server 39 must be carried out in compliance with the international roaming standard WISPr (wireless Internet service provider roaming). It is to be noted that the WISPr proposed by the Wi-Fi Alliance, is used as a guideline for ISP-to-ISP roaming sequences. In other words, the WISPr has been proposed to assure reliable connection to the Internet based upon user authentication through roaming, since wireless LAN access does not enable identification of the user access point location and access points may not be installed by a single ISP all over the world.

The public access point 31 is installed at a location open to the general public, such as an airport, a train station, a hotel or restaurant. Normally, the user of the electronic camera 1 is able to obtain information needed to use the public access point 31 by pre-registering with the ISP for subscription, paying a specific fee and thus completing the user sign-up procedure in advance. The information includes a user ID and password used for user authentication when the user wishes to connect with the public access point 31. However, the manufacturer, the vendor or the like of the electronic camera in the embodiment shall have reached a pre-agreement with a specific ISP, which offers free Internet connection via the ISP as a perquisite to allow the purchaser to access a server operated by the manufacturer or the like over a predetermined period of time (e.g., a predetermined period of time (30 days, three months, etc.) following the purchase of the electronic camera or initial use of the service). It is to be noted that some ISPs do not require user authentication and allow anyone to use their public access points 31 free of charge. The home access point 32, installed in the user's home, office or the like, may be used by the user and parties authorized by the user.

An online album server 34 provides an online album service to the user of the electronic camera 1. Through the online album service, images transferred from electronic cameras 1 are sorted and accumulated in correspondence to individual users and are made available for viewing on the Internet as necessary. Online albums each corresponding to a user of an electronic camera 1 are preregistered at the online album server 34. Each online album contains a plurality of folders. As an image photographed with an electronic camera 1 owned by a specific user is transferred to the online album server 34 via the wireless LAN and the Internet 33, the transferred image is stored into one of the folders set in the online album belonging to the user.

A mail transmission server 35 provides a mail transmission service to the user of the electronic camera 1. Through the mail transmission service, a notice mail appended with a thumbnail image of an image having been transferred from the electronic camera 1 or a notice mail containing link information used to display the thumbnail image is created and the notice mail is transmitted to a specified mail address. By using the mail transmission service, the user is able to draw the attention of a person other than the user to the image having been transferred from the electronic camera 1 with the notice mail transmitted to the person. In addition, the mail transmission server 35 creates a webpage where the recipient of the notice mail is able to view the image and makes the webpage thus created available on the Internet. For this reason, the notice mail includes link information providing a link to the webpage.

The user is able to use either the online album service offered by the online album server 34 or the mail transmission service offered by the mail transmission server 35. In each session, the user may select the specific service he wishes to use or the specific service he wishes to use may be selected in advance. As an alternative, the specific service to be used may be determined in advance by the manufacturer of the electronic camera 1. For instance, if the manufacturer manufactures electronic cameras 1 intended to be shipped to various destinations (shipment zones), the manufacturer may preselect a specific destination setting for each electronic camera 1 in order to adjust the specifications of the electronic camera 1 in correspondence to the requirements stipulated in the particular marketplace. Under such circumstances, the specific service to be used may be determined based upon the destination setting. Once the specific service to be used in conjunction with the electronic camera 1 has been determined through a user selection or based upon a destination setting, as described above, either the online album server 34 or the mail transmission server 35 is selected as an image transfer recipient in correspondence to the selection result or the destination setting.

It is to be noted that PCs (personal computers) 36 and 37, as well as the electronic camera 1, may be connected to the home access point 32 through a wireless LAN connection. The PCs 36 and 37 are capable of taking in an image having been photographed with the electronic camera 1 and transferred from the electronic camera 1, saving the obtained image by recording it and executing various types of image processing on the image. A printer 38 is connected to the PC 37 and thus, an image obtained at the PC 37 may be printed out via the printer 38.

The printer dongle 41 is a wireless LAN print server engaged in operation through a connection to a USB port or the like of a printer 42, which is in compliance with the USB (universal serial bus) standard set forth by the USB implementers forum (USB-IF). Image data received at the printer dongle 41 from the electronic camera 1 are output to the printer 42. Then, the image may be directly printed out via the printer 42 without requiring any PC operation. A PC 51 has a wireless LAN communication capability and, as do the PCs 36 and 37 connected to the home access point 32, it takes in an image transferred from the electronic camera 1, saves it by recording it and executes various types of image processing on the image.

(Structure of the Electronic Camera)

Figure 2:
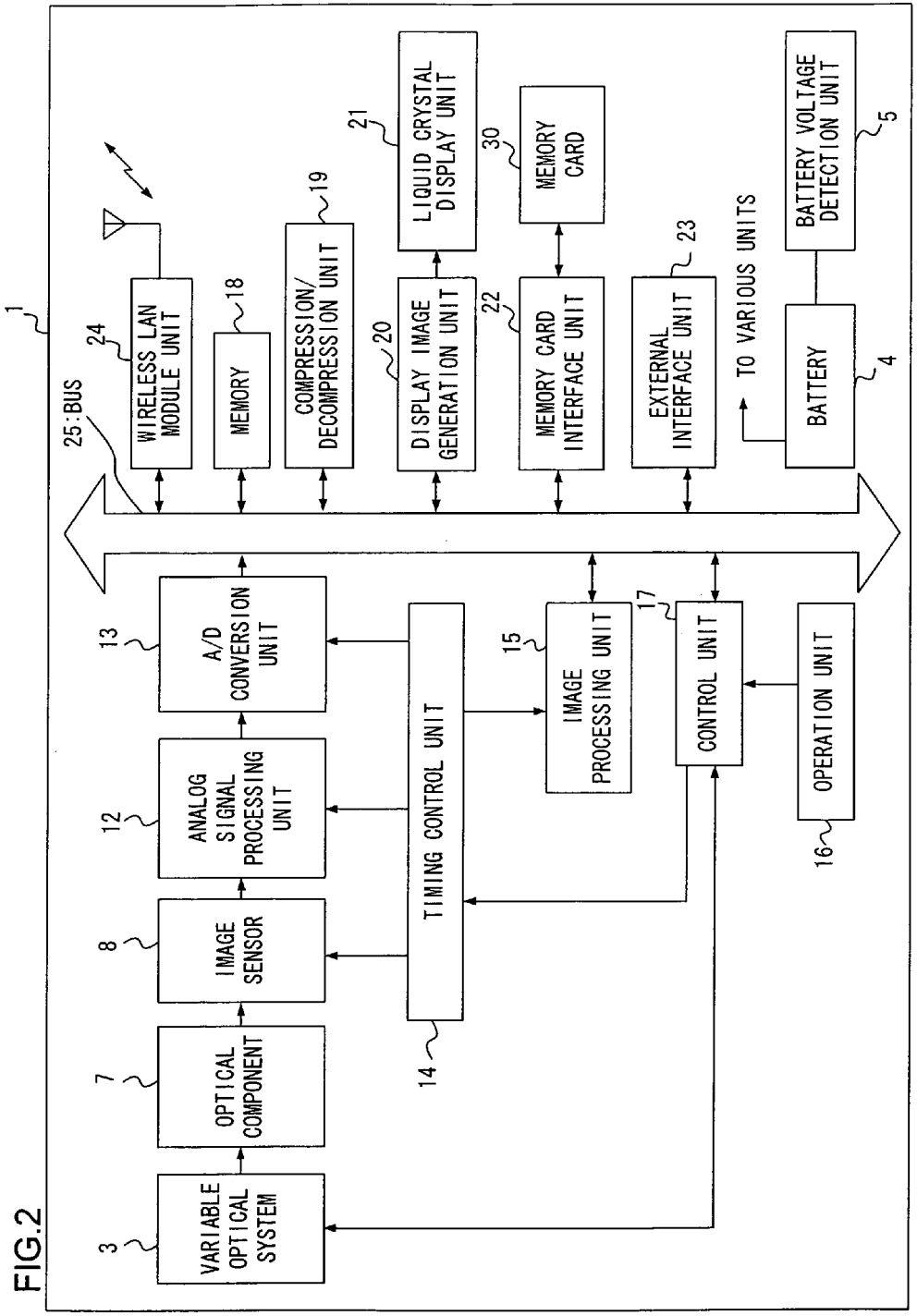

FIG. 2 is a schematic block diagram showing the structure adopted in the electronic camera 1. The electronic camera 1 comprises a battery 4, a battery voltage detection unit 5, a variable, optical system 3, an optical component 7, an image sensor 8, an analog signal processing unit 12, an A/D conversion unit 13, a timing control unit 14, an image processing unit 15, an operation unit 16, a control unit 17, a memory 18, a compression/decompression unit 19, a display image generation unit 20, a liquid crystal display unit 21, a memory card interface unit 22, an external interface unit 23 and a wireless LAN module unit 24.

Power needed in the individual units constituting the electronic camera 1 to execute specific operations is supplied to the various units from the battery 4. The power supply from the battery 4 to each unit is permitted or prohibited based upon the operating conditions of the electronic camera 1. The control unit 17 controls the power supply conditions. The voltage output from the battery 4 (battery voltage) is detected by the battery voltage detection unit 5. The detection result indicating the battery voltage is output from the battery voltage detection unit 5 to the control unit 17.

The variable optical system 3 includes a photographic lens constituted with a plurality of optical lens groups, an aperture, a shutter and the like. The optical component 7 is constituted with an optical filter, a glass cover or the like. As a light flux originating from the subject passes through the variable optical system 3 and the optical component 7, a subject image is formed on the image sensor 8.

The image sensor 8 captures the subject image formed via the variable optical system 3 and outputs image signals (imaging signals) corresponding to the captured subject image. The image sensor 8 includes a rectangular imaging area formed with a plurality of pixels and sequentially outputs analog image signals corresponding to the levels of electrical charges accumulated at the individual pixels, to the analog signal processing unit 12, one image signal corresponding to a specific pixel at a time. The image sensor 8 may be, for instance, a single-substrate color CCD. The analog signal processing unit 12, which includes a built-in CDS (correlation double sampling) circuit, a built-in AGC (auto gain control) circuit and the like, executes a specific type of analog processing on the image signals input thereto. The A/D conversion circuit 13 converts the analog signals having undergone the processing in the analog signal processing unit 12 to digital signals. The timing control unit 14, operating under control executed by the control unit 17, controls the timing of the operations executed at the image sensor 8, the analog signal processing unit 12, the A/D conversion unit 13 and the image processing unit 15.

The memory card interface unit 22 functions as an interface with a memory card (a card-type removable memory) 30 installed in the electronic camera 1. The external interface 23 functions as an interface with an external device connected via a specific cable conforming to, for instance, the USB standard. The wireless LAN module unit 24 enables the electronic camera to exchange radio waves with the public access point 31, the home access point 32, the printer dongle 41 or the PC 57 through the wireless LAN by executing processing such as data format conversion, data encoding, modulation/demodulation and frequency conversion.

The operation unit 16 is constituted with various operation buttons and switches. Such operation buttons and switches include, for instance, a shutter release button, a mode dial, a reproduction button, direction buttons, a menu button, a confirm button, a delete button and a help button. The mode dial is a selector dial operated to switch the camera operation mode. The operation modes that may be selected via the mode dial include at least a photographing mode, in which an image is photographed and a wireless LAN mode in which an image is transferred to the online album server 34, the mail transmission server 35, the PC 36, the PC 37, the printer 38, the printer 42 or the PC 51 through wireless communication with the public access point 31, the home access point 32, the printer dongle 41 or the PC 51.

The reproduction button is operated to display a reproduced image on the liquid crystal display unit 21. The direction buttons are operated to shift the position the user wishes to select in an operation screen brought up on display at the liquid crystal display unit 21. The menu button is operated to display a menu screen on the liquid crystal display unit 21. The confirm button is operated to confirm that a given operation is to be executed. The delete button is operated to delete an image or the like that is no longer needed. The help button is operated to bring up on display more detailed information or the like. It is to be noted that a plurality of functions may be allocated to a single button and a specific function among the plurality of functions allocated to the button may be engaged in correspondence to the operating state.

The liquid crystal display unit 21 is a display device at which various types of operation screens, each corresponding to a specific operating state of the electronic camera 1, the subject image captured by the image sensor 8 or a reproduced image generated based upon image data stored in the memory card, is brought up on display. An output from the operation unit 16 is input to the control unit 17, whereas an output from the display image generation unit 20 is input to the liquid crystal display unit 21. The image processing unit 15 may be constituted with, for instance, a single-chip microprocessor dedicated to image processing. In the memory 18, constituted with a flash memory, software programs based upon which the electronic camera 1 is controlled and data, such as related information, identification information generation rules, ID/PW generation rules, a list of messages corresponding to specific error codes, access point information, profile information and the like to be detailed later, are stored in advance or as needed.

The A/D conversion unit 13, the image processing unit 15, the control unit 17, the memory 18, the compression/decompression unit 19, the display image generation unit 20, the memory card interface unit 22, the external interface unit 23 and the wireless LAN module unit 24 are connected with one another via a bus 25.

As the user selects the photographing mode by operating the operation unit 16 and presses the shutter release button at the electronic camera 1 structured as illustrated in FIG. 2, the control unit 17 controls the variable optical system 3 to adjust focus and also executes timing control for the image sensor 8, the analog signal processing unit 12 and the A/D conversion unit 13 via the timing control unit 14 in order to capture a subject image. It is to be noted that a plurality of photographing modes, each corresponding to a specific subject type, may be made available to be selected at the electronic camera and, in such a case, the timing control executed in the electronic camera may be adjusted in correspondence to the selected photographing mode.

The image sensor 8 generates image signals corresponding to the subject image formed over the imaging area via the variable optical system 3. The image signals undergo the specific type of analog signal processing at the analog signal processing unit 12 and then the image signals having undergone the analog processing are output to the A/D conversion unit 13. The image signals having undergone the analog processing are digitized in the A/D conversion unit 13 and image data resulting from the A/D conversion are provided to the image processing unit 15.

It is assumed that the image sensor 8 in the electronic camera 1 achieved in the embodiment is a typical single-substrate color image sensor with R (red), G (green) and B (blue) color filters disposed in a Bayer array and that the image data provided to the image processing unit 15 are expressed in the RGB colorimetric system. Each of the pixels constituting the image data holds color information corresponding to a specific color component among R, G and B. While the period "pixel" is used to refer to each photoelectric conversion element in the image sensor 8, the period "pixel" is also used to refer to each image data unit corresponding to the former "pixel". In addition, the embodiment is described based upon a concept that an image is constituted with a plurality of pixels.

The image processing unit 15 executes image processing such as interpolation, gradation conversion and edge emphasis on the image data. Once the image processing on the image data has been completed, the image data undergo a specific type of compression processing at the compression/decompression unit 19 as needed and are then recorded into the memory card 30 via the memory card interface unit 22. It is assumed that the image data having undergone the image processing shall have undergone interpolation processing and thus each pixel holds information corresponding to all the color components R, G and B.

The image data having been recorded into the memory card 30 are wirelessly transmitted from the wireless LAN module unit 24 to the public access point 31, the home access point 32, the printer dongle 41 or the PC 51 in response to a user operation. This wireless transmission is executed in compliance with standard wireless LAN specifications such as the IEEE 802.11b or the IEEE 802.11g. The wireless transmission should be executed in compliance with the Wi-Fi (wireless fidelity) certification, which is a standard international protocol adopted to assure compatibility among various wireless LAN devices.

The image data transmitted from the wireless LAN module unit 24 in the electronic camera 1 are passed on to the Internet 33 via the public access point 31 or the home access point 32. The image data are then transferred to the online album server 34 or the mail transmission server 35 via the Internet 33. In addition, image data transmitted from the wireless LAN module unit 24 may be transferred to the PC 36 or the PC 37 via the home access point 32. Image data transmitted to the printer dongle 41 from the wireless LAN module 24 are output to the printer 42.

The electronic camera 1 is connected via the wireless LAN with the online album server 34, the mail transmission server 35, the PC 36, the PC 37, the printer 42 or the PC 51, as described above. An image photographed with the electronic camera 1 may thus be transmitted from the electronic camera 1 to a given server or a given device. It is to be noted that the image originating from the electronic camera 1 is transmitted in compliance with the communication protocol called "CIPA" (Camera & Imaging Products Association) DC-005-2005 standard PTP-IP (picture transfer protocol over TCP/IP networks) compiled based upon the ISO standard 15740 specification PTP (picture transfer protocol). In addition, the printer 42 operates in compliance with the DC-001-2003 standard PictBridge (Digital Photo Solutions for Imaging Devices).

(Identification Information Generation Processing Executed in the Electronic Camera)

Figure 3:
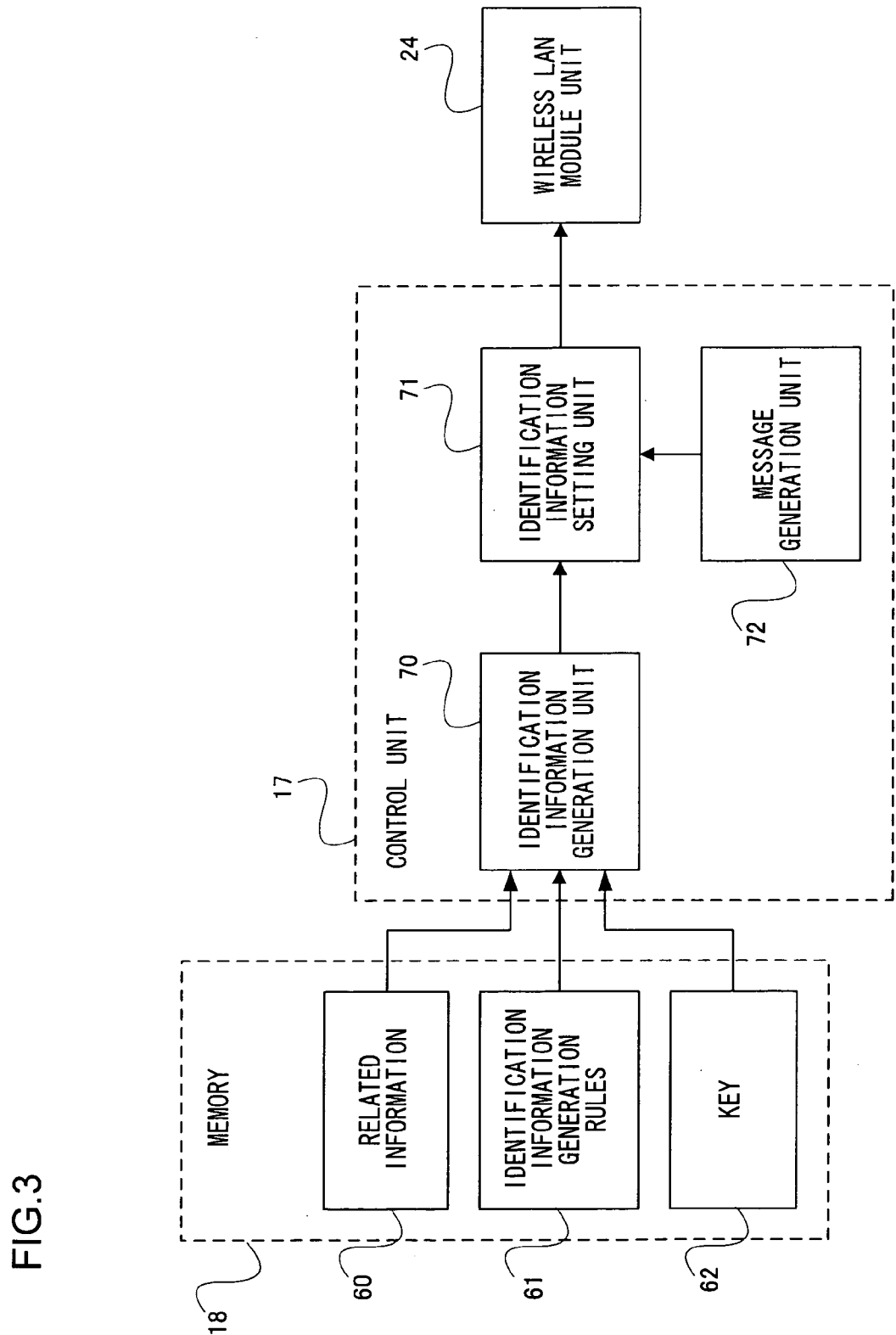
Figure 4:
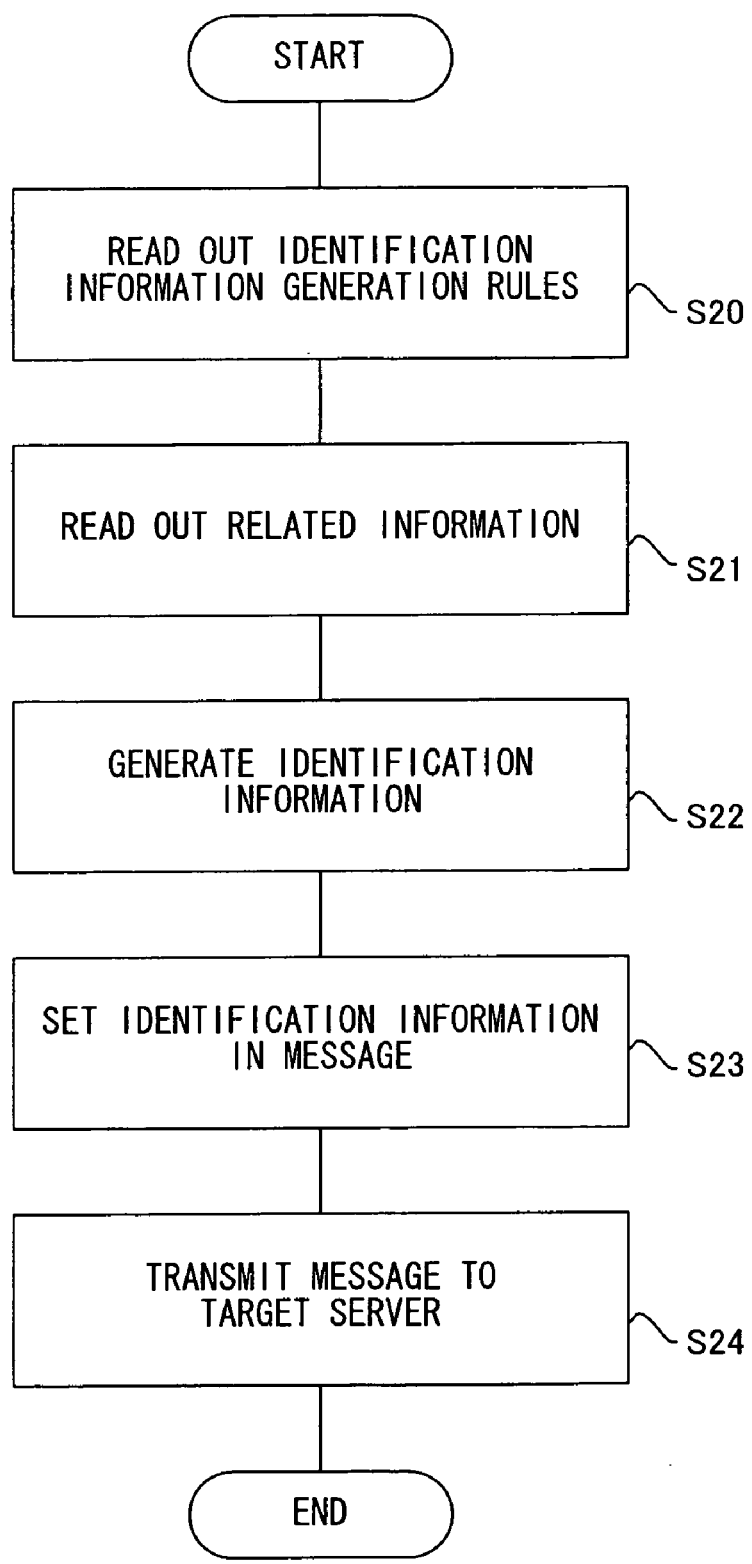

Next, in reference to FIGS. 3 through 5, the identification information generation processing executed when the electronic camera 1 needs to transmit a message to a server such as the online album server 34, the mail transmission server 35 or the authentication server 39 connected to the Internet 33 is described. The period "identification information" used in this context refers to individual identification information based upon which the electronic camera 1 may be identified as a device distinguishable from other cameras or devices (personal computers, portable telephones and the like). The identification information is generated to indicate to the recipient server receiving the message from the electronic camera 1 that access has been initiated by the electronic camera 1. However, the identification information does not necessarily enable identification of the exact device identity of the electronic camera 1 and instead, identification information that simply enables the recipient server receiving the message from the electronic camera 1 to judge whether or not the electronic camera is a service subscriber camera may be used, instead.

In the memory 18 in the electronic camera 1, related information 60, identification information generation rules 61 and a specific key 62 are stored as shown in FIG. 3. The related information 60 includes manufacturer information used to identify the manufacturer of the electronic camera 1, indicating the manufacturer's name, the manufacturer's identification code or the like, product information used to identify the product indicating the product name, the product identification code or the like of the electronic camera 1 and a serial number, such as a product number, assigned to each individual device among devices manufactured to single-model specifications. The related information 60 may further include information indicating the MAC address, the camera ID, the firmware program version, the communication protocol version and the like. Such information, already available at the time of shipment of the electronic camera 1, is stored in the electronic camera 1 (memory 18) prior to its shipment from the factory.

In addition, the related information 60 may include information set after the shipment from the factory, such as an IP address assigned when the electronic camera is connected to the Internet, in addition to the information described above which is available and stored into the electronic camera 1 prior to shipment from the factory.

The identification information generation rules 61, in conformance to which an identification information generation unit 70 in the control unit 17 dynamically generates identification information based upon part of or all of the related information 60, are stored in advance into the memory 18 of the electronic camera 1 prior to shipment from the factory. The identification information generation rules 61 are provided as information having set therein rules indicating specific types of information in the related information 60 to be used when generating the identification information, indicating information that may be part of or all of the information used for the identification information generation, to undergo some form of processing and the processing method to be adopted, indicating the order in which various types of information are set and the like. It is to be noted that as part of or all of the information is processed as described above, a key may be appended, the information may be converted, the information may be encrypted or the like.

The key 62 is constituted with a numerical value and/or characters arbitrarily set in advance. While the key 62 is shown as a separate entity from the identification information generation rules 61 in the figure, the key may be set as part of the identification information generation rules 61.

FIG. 4 presents a flowchart of the identification information generation processing executed by the control unit 17. After the processing starts, the identification information generation unit 70 first reads out the identification information generation rules 61 from the memory 18 (step S20), reads out the related information 60 from the memory 18 (step S21) in conformance to the identification information generation rules 61 having been read and then generates identification information (step S22) by processing the related information 60 having been readout and arranging the processed information.

In this embodiment, the identification information generation unit 70 generates identification information by arranging the manufacturer information, the communication protocol version information, the product information and the serial number in this order in conformance to the identification information generation rules 61. Such identification information may read, for instance, "niko/Ver. 1/S100C/0025". The MAC address, the IP address, the camera ID and the like may also be appended. It is to be noted that the IP address included in the identification information may be the IP address assigned to the electronic camera when it is connected to the Internet 33. Accordingly, if the IP address is to be appended to the identification information, the identification information shall have to be generated by the identification information generation unit 70 after establishing a communication link with the access point 31. Since the identification information is dynamically generated based upon the related information 60 as described above, there is no need to store in advance such identification information in the memory of the electronic camera.

The identification information generated by the identification information generation unit 70 is provided to an identification information setting unit 71, is set (in step S23) in a request message having been separately generated by a message generation unit 72, and is transmitted (step S24) to the Internet 33 via the wireless LAN module unit 41 to be sent to a specific ultimate recipient server such as the online album server 34.

Provided that the electronic camera 1 and the specific server communicate with each other in, for instance, HTTP, the identification information may be set in the request message by setting it as a "User Agent" in the message header of an HTTP request message, as shown in FIG. 5. The specific server having received the request message is able to identify the access-initiating device as the electronic camera 1 based upon the identification information set in the "User Agent" and is able to make a decision as to whether or not to extend its service to the access-initiating device accordingly. The identification information is set in all request messages transmitted from the electronic camera 1 to servers and the like.

While an image is normally uploaded to the online album server 34 through standard communication between the electronic camera 1 and the server 34 without encrypting any data through the SSL (secure socket layer)/TLS (transport layer security) or the like, part of or all of the identification information set in the "User Agent" may be processed.

For instance, the key 62 stored in the memory 18 may be appended to the serial number included in the identification information and the hash value, determined by encrypting the key with a hash function that may not be decrypted, may be set in the identification information so as to ensure that the electronic camera may not be identified based upon the identification information alone. In this case, the specific server such as the online album server 34 must have information identical to the related information 60, the identification generation rules 61 and the key 62 described above or partial information selected from the related information, the identification information generation rules and the key and required to decode the encrypted identification information. It is to be noted that any hash function among MD5 defined in the Internet Engineering Task Force (IETF) RFC 1321, SHA-1 defined in the Federal Information Processing Standard (FIPS) publications 180-2 and the like may be used for such purposes. It is also to be noted that the identification information may be encrypted through another method, e.g., by encrypting part of or all of the identification information with the key 62.

(User Id/Password Generation Processing Executed in the Electronic Camera)

Figure 6:
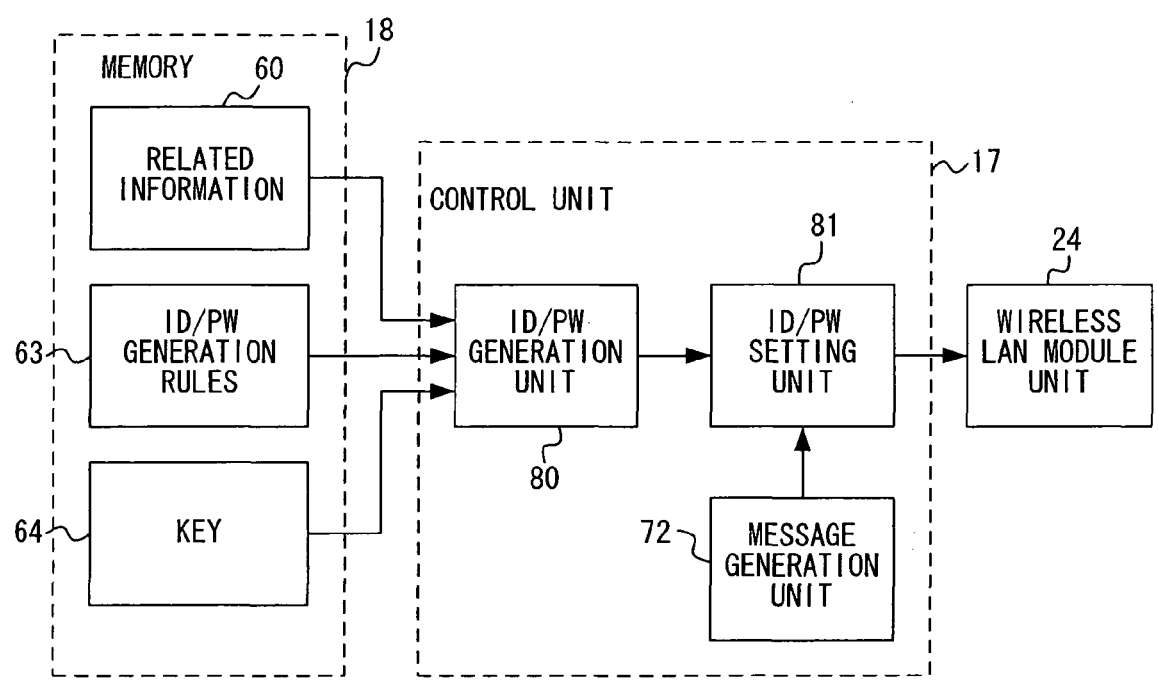
Figure 7:
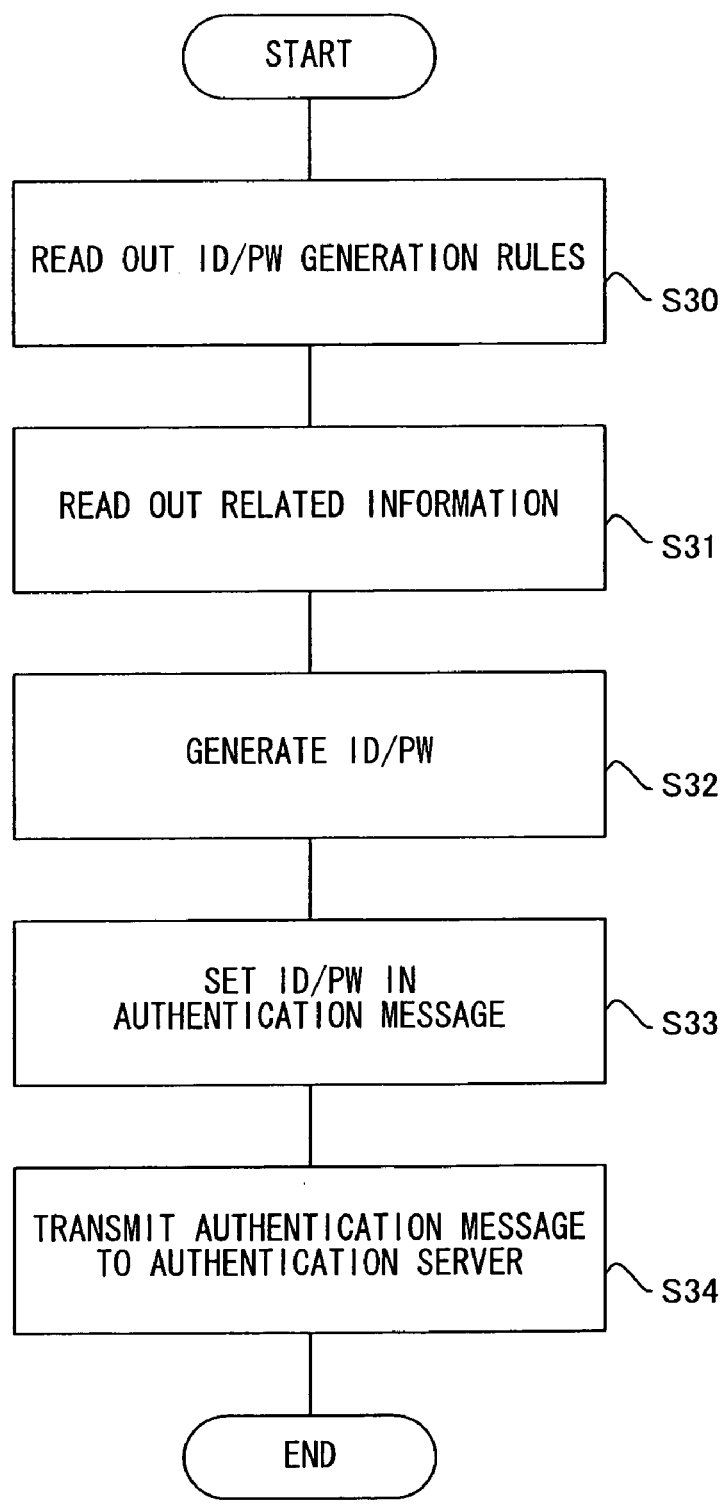

Next, in reference to FIGS. 6 through 8, the user ID/password (ID/PW) generation processing executed when transmitting an authentication message to the authentication server 39 from the electronic camera 1 attempting to connect with the Internet 33 is described. The user ID and password as referred to in this context are used as information to prove that the user is authorized to connect with the Internet 33 by using the ISP operating the authentication server 39.

In the memory 18 in the electronic camera 1, related information 60, ID/PW generation rules 63 and a specific key 64 are stored as shown in FIG. 6. The related information 60 assigned with the same reference number as that in FIG. 3 is identical to the related information described earlier in reference to FIG. 3. However, related information different from that described in reference to FIG. 3 may be stored in the memory 18. In addition, the message generation unit 72 in FIG. 6, assigned with the same reference number as that shown in FIG. 3, is the same message generation unit as the message generation unit shown in FIG. 3.

The ID/PW generation rules 63, in conformance to which an ID/PW generation unit 80 in the control unit 17 dynamically generates a user ID and a password based upon part of or all of the related information 60, are stored into the memory 18 in advance before the electronic camera 1 is shipped from the factory. The ID/PW generation rules 63 are provided as information having set therein rules indicating specific types of information in the related information 60 to be used when generating the ID/password, indicating information that may be part of or all of the information, to undergo some form of processing and the processing method to be adopted, indicating the order in which various types of information are set and the like.

The key 64 is constituted with a numerical value and/or characters arbitrarily set in advance. While the key 64 is shown as a separate entity from the ID/PW generation rules 63 in the figure, the key may be set as part of the ID/PW generation rules 63, instead. The key 62 shown in FIG. 3 may also be used as the key 64.

FIG. 7 presents a flowchart of the ID/PW generation processing executed by the control unit 17. After the processing starts, the ID/PW generation unit 80 first reads out the ID/PW generation rules 63 from the memory 18 (step S30), reads out the related information 60 from the memory 18 (step S31) in conformance to the ID/PW generation rules 61 having been read and then generates a user ID and a password by processing the related information 60 having been read out and arranging the processed information. It is to be noted that as part of or all of the information is processed as described above, a key may be appended, the information may be converted, the information may be encrypted or the like, as has been explained earlier in reference to FIG. 3.

In the embodiment, the ID/PW generation unit 80 generates a user ID (step S32) by setting the product information, the serial number and the manufacturer information in this order in conformance to the ID/PW generation rules 63. Such a user ID may read, for instance, "S100C0025@niko". In addition, the ID/PW generation unit 80 calculates a hash value by converting the serial number appended with the key 64 with a hash function and designates the hash value as a password (step S32) in conformance to the ID/PW generation rules 63. Such a password may read, for instance, "015723 . . . ". Since the user ID and password are both dynamically generated based upon the related information 60, as described above, there is no need to store the user ID or password in advance in the memory of the electronic camera. Furthermore, the user is able to start using the online album service and the like without having to perform any laborious and time-consuming procedure following the purchase of the camera.

The user ID and password having been generated by the ID/PW generation unit 80 are provided to an ID/PW setting unit 81, which then sets the user ID and the password (step S33) in an authentication request message having been generated separately by the message generation unit 72. The authentication request message with the user ID and password set therein is then transmitted to the authentication server 39 via the wireless LAN module unit 24 (step S34).

Provided that the electronic camera 1 and the authentication server 39 communicate with each other through HTTP, the user ID and password may be set in the authentication request message by setting them in the message body of an HTTP request message, as shown in FIG. 8. It is to be noted that the authentication request message is written in XML (extensible markup language) in compliance with the international roaming standard WISPr protocol.

As described in detail later, the authentication server 39 having received the authentication request message compares the user ID and password set in the authentication request message, judges the legitimacy of the user ID and password and makes a decision as to whether or not to allow the electronic camera to connect with the Internet 33 via the access point 31. It is to be noted that the communication between the authentication server 39 and the electronic camera 1 is normally carried out with data encrypted through the SSL/TLS or the like.

(Authentication Processing Executed at the Authentication Server)

Figure 9:
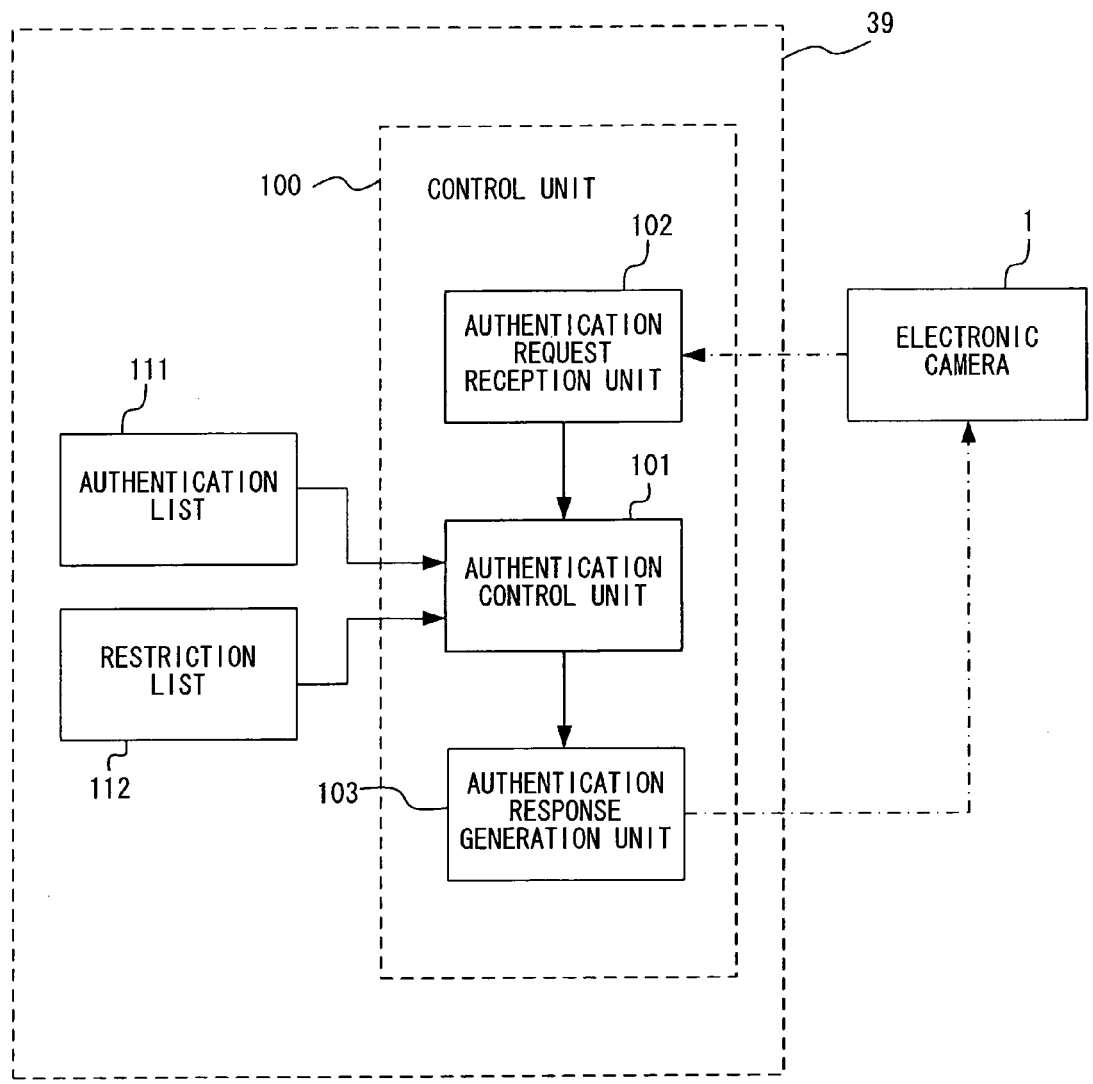
Figure 10:
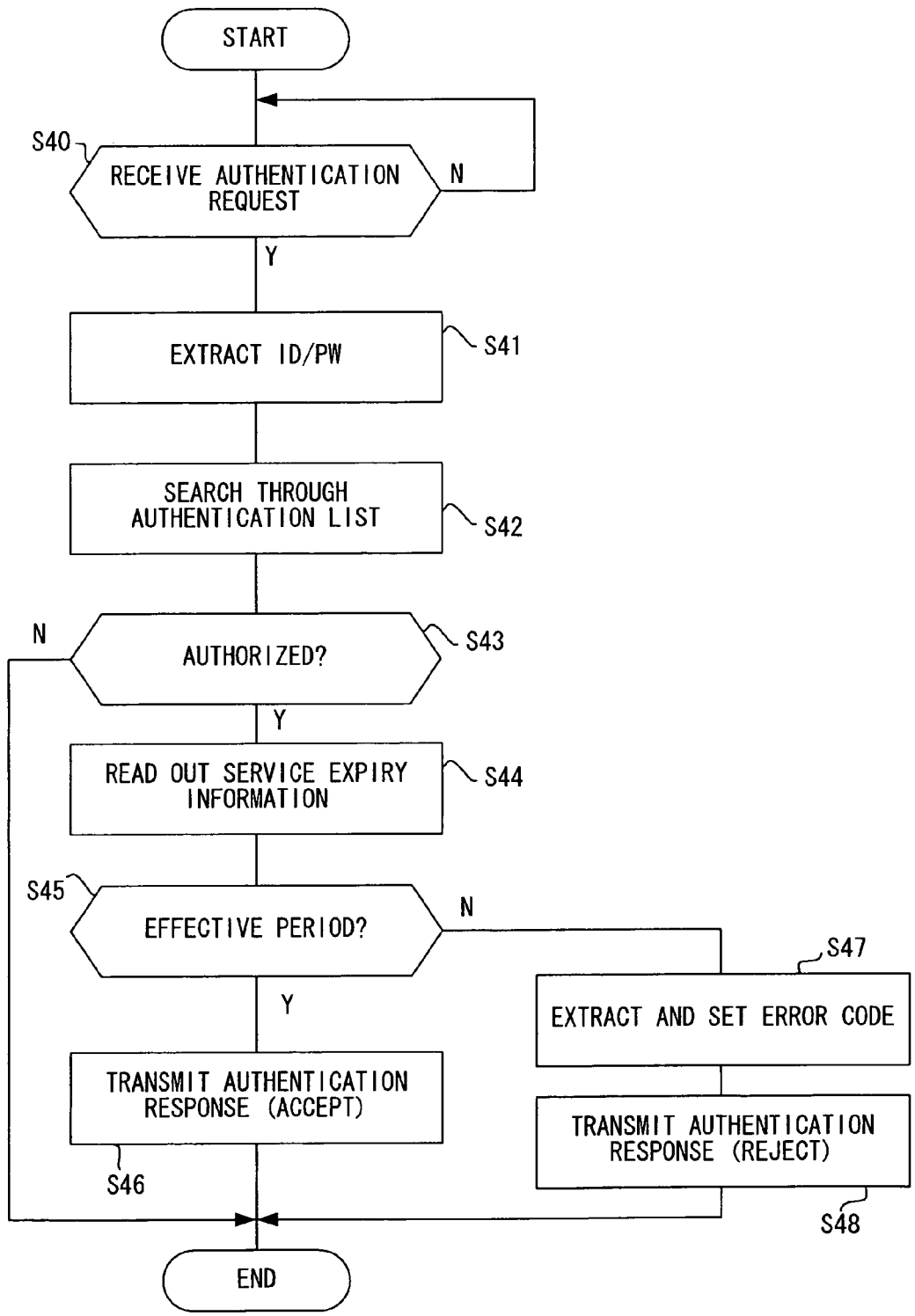

Next, in reference to FIGS. 9 and 10, the authentication processing executed at the authentication server 39 upon receiving the authentication request message from the electronic camera 1 as described above is explained. The authentication server 39 is a RADIUS (remote authentication dial-in user service) server operating in compliance with the WISPr protocol. The RADIUS client in this instance is the access point 31 and the communication between the authentication server 39 and the access point 31 is carried out in compliance with the RADIUS protocol. Upon receiving the authentication request message from the electronic camera 1, the access point 31 extracts the user ID and password set in the message and transmits a RADIUS request packet containing the user ID and password to the authentication server 39 in compliance with the RADIUS protocol. The authentication server 39 then executes the authentication processing to be described later and returns a RADIUS response packet containing the authentication result to the access point 31.

It is to be noted that while the explanation is given by assuming that the access point 31 is provided by the ISP operating the authentication server 39 and that the authentication request message received at the access point 31 from the electronic camera 1 or the like is transferred to the authentication server 39, the authentication request message from the electronic camera 1 shall include ISP identification information to be used to identify the ISP operating the authentication server 39 and the RADIUS request packet shall be sent to the correct authentication server from the access point 31 based upon the ISP identification information if the access point 31 is provided by another ISP or the like, different from the ISP operating the authentication server 39, and the access point 31 is shared by a plurality of ISPs.

As shown in FIG. 9, the authentication server 39 comprises a control unit 100 that includes an authentication control unit 101, an authentication request reception unit 102 and an authentication response generation unit 103 and a memory where a specific authentication list 111 and a specific restriction list 112 are stored. The authentication list 111 is constituted with information set based upon a pre-agreement reached by the ISP operating the authentication server 39 and the manufacturer or the like of the electronic camera 1 and the service enabling a connection with the Internet 33 may be provided via the ISP to an electronic camera (user) identified based upon the information set in the list 111.

The authentication list 111 holds information such as that shown in FIG. 11, indicating a plurality of user IDs and passwords corresponding to the individual user IDs. The restriction list 112 is constituted with information set based upon a pre-agreement reached by the ISP operating the authentication server 39 and the manufacturer or the like of the electronic camera 1 and indicating restrictions imposed with regard to the use of the Internet connection service offered by the ISP. For instance, the restriction list may hold service expiry information such as that shown in FIG. 12, indicating a specific expiry date or a specific length of time defining the period over which the Internet connection service is available.

As the service expiry information, a specific length of time (e.g., 30 days, three months) or a specific expiry date (e.g., Jun. 1, 2007) may be set provided that each user having purchased a camera or starting to use the Internet connection service is entitled to use the Internet connection service via the ISP over a predetermined length of time following the camera purchase or the initial use of the Internet connection service. In the example presented in FIG. 12, expiry dates are set as the service expiry information. It is to be noted that the restriction list may further include restriction information related to an accessible server. Such accessible server restriction information is set when the users are allowed to connect only with a specific server (e.g., the online album server 34 or the mail transmission server 35) connected to the Internet 33 but are not allowed to connect with other servers and may indicate, for instance, the URL of the connection-allowed server.

The embodiment is described by assuming that the manufacturer of the electronic camera 1 offers a sales campaign deal which allows each user purchasing the electronic camera 1 free access to the online album server 34 through Internet connection over a specific period of time following the purchase and that the restriction information set in the restriction list 112 indicates the campaign expiry dates and the URL of the online album server 35.

FIG. 10 presents a flowchart of the authentication processing executed by the control unit 100 in the authentication server 39. An authentication request transmitted from the electronic camera 1 via the access point 31 (not shown in FIG. 9) is received as a RADIUS request packet at the authentication request reception unit 102 in the control unit 100 (step S40) and is passed on to the authentication control unit 101. The authentication control unit 101 extracts the user ID, the password and the like (step S41) contained in the authentication request having been passed on thereto, searches through the authentication list 111 in the memory 110 for a match with the extracted user ID and password (step S42), makes a decision as to whether or not there are data matching the user ID and password (step S43) and determines that the user having issued the authentication request is an authorized user if a match is found.

Next, the service expiry information set as the restriction information corresponding to the particular user ID is read out from the restriction list 112 (step S44) and a decision is made as to whether or not the campaign deal is still on (step S45). If it is decided in step S45 that the campaign deal is still on, the communication between the electronic camera 1 and the specific server (the online album server 34 in this example) indicated by the URL in the corresponding restriction information in the restriction list 112 is enabled, information indicating that access has been accepted is set in a RADIUS response packet to be sent as an authentication response and the authentication response is transmitted to the electronic camera 1 via the access point 31 (step S46). As a result, the electronic camera 1 is allowed to connect with the Internet and is thus able to access the online album server 34.

If it is decided in step S45 that the campaign period has expired, a specific error code in an error code list (not shown) set based upon a pre-agreement reached in advance by the ISP operating the authentication server 39 and the manufacturer of the electronic camera 1 and the like, is extracted and set (step S47) together with information indicating that access has been rejected in a RADIUS response packet to be sent as an authentication response. The authentication response is then transmitted to the access point 31 (step S48).

The error code is set as a response code in an authentication response that is transmitted in conformance to the WISPr when the authentication of an electronic camera 1 having sent an authentication request has been denied at the authentication server 39 for a specific reason (the campaign period has expired in this example). In the WISPr, "0"~"255" are reserved as response codes, and accordingly, a code other than those reserved in the WISPr should be used as the error code. For instance, "300" may be used as the error code in the embodiment.

The access point 31, having received the authentication response from the authentication server 39, sets the error code in the authentication response into a specific response message and sends the response message to the electronic camera 1, instead of granting the use of the Internet 33 to the electronic camera 1. In this case, the electronic camera 1 is denied the use of the Internet and if the user of the electronic camera wishes to use the Internet, the user needs to perform user registration with the ISP separately.

(Message Display Processing Executed at the Electronic Camera)

Figure 13:
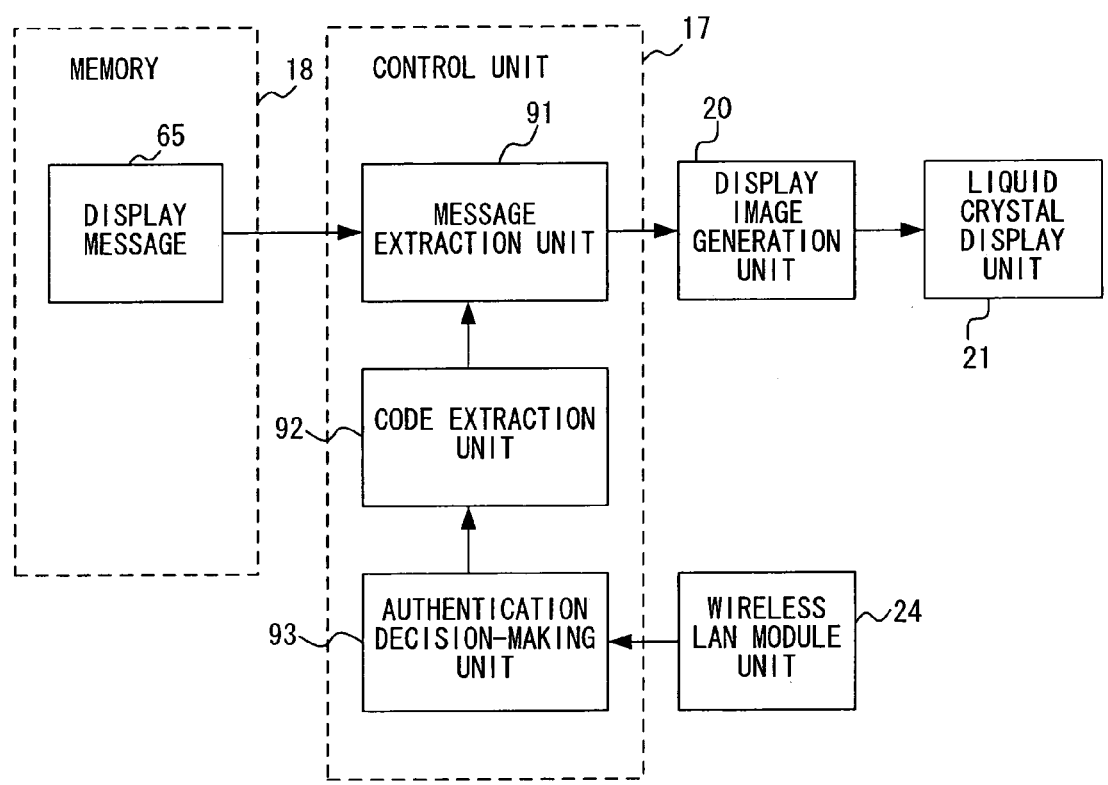
Figure 14:
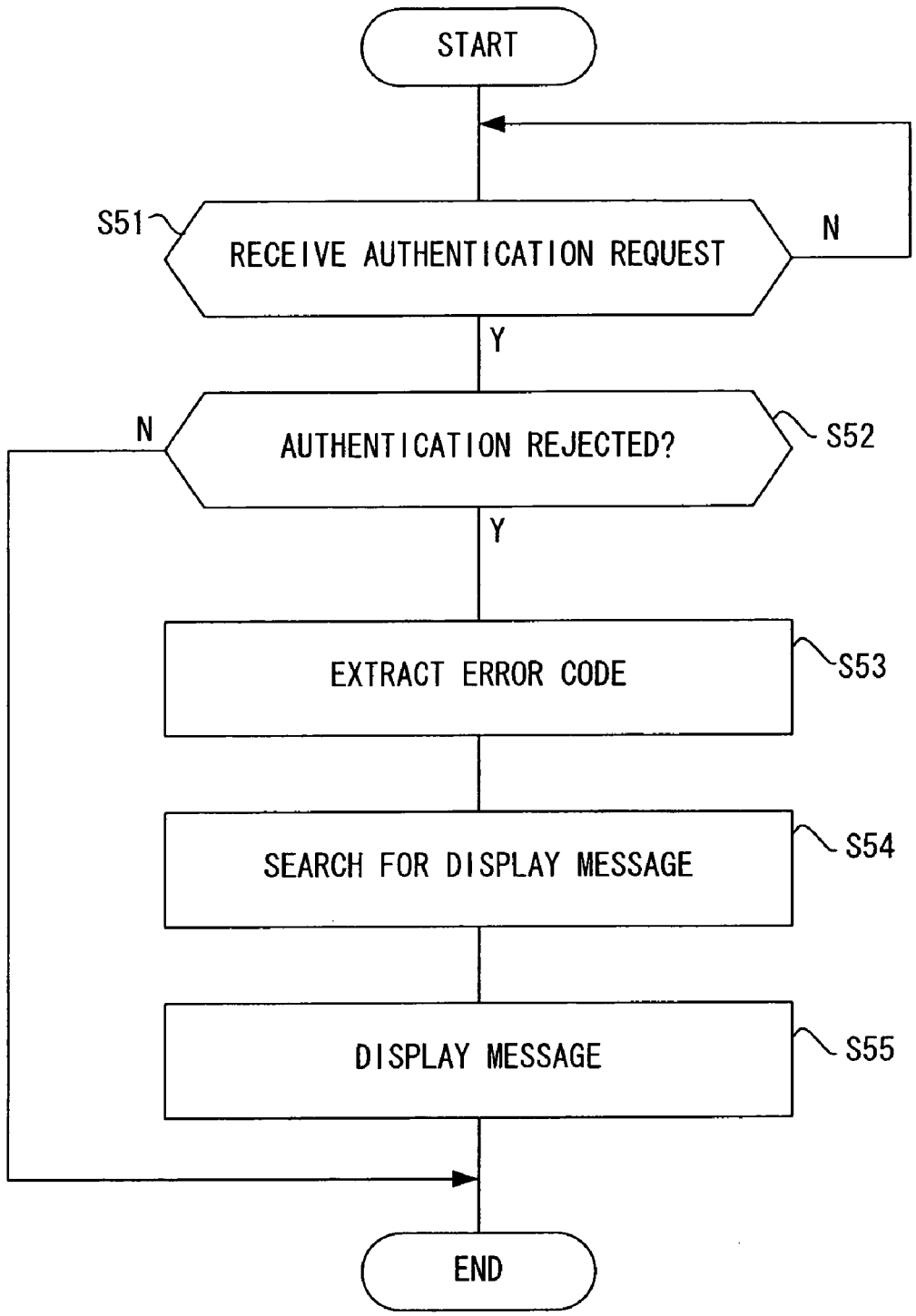

Next, in reference to FIGS. 13 through 15, the message display processing executed at the electronic camera 1 after the authentication request from the electronic camera 1 is turned down at the authentication server 39 is described. As shown in FIG. 13, the control unit 17 in the electronic camera 1 includes a display message extraction unit 91, an error code extraction unit 92 and an authentication result decision-making unit 93, and a display message list 65 is stored in advance in the memory 18 at the electronic camera 1.

The display message list 65, such as that shown in FIG. 15, is a list of specific display messages (either text data or image data), set each in correspondence to one of a plurality of error codes. In the example presented in FIG. 15, a specific text message prompting user registration at the ISP operating the authentication server is set in correspondence to the error code "300" indicating that authentication of the electronic camera 1 has been denied by the authentication server 39 due to expiry (e.g., the free service period has expired). Such a text message may read "Your free Internet connection service period has expired. For continued service, please register as a new user by visiting . . . (the URL of the ISP registration site)". Instead of the URL or in addition to the URL, the telephone number or the like of the ISP may be given in the message.

FIG. 14 presents a flowchart of the message display processing executed by the control unit 17 in the electronic camera 1. An authentication response (authentication response message) originating from the authentication server 39 is received (step S51) at the wireless LAN module 21 via the access point 31 and is then passed over to the authentication decision-making unit 93. Based upon the information included in the authentication response, the authentication decision-making unit 93 makes a decision (step S52) as to whether or not the authentication server 39 has rejected access. If authentication has been rejected, the error code extraction unit 92 extracts the error code included in the authentication response as described earlier (step S53). The message extraction unit 91 then searches through the display message list 65 by referencing the extracted error code and reads out the display message corresponding to the error code (step S54). The display message thus read out is brought up on display at the liquid crystal display unit 21 via the display image generation unit 20 (step S55).

The display message informs the user of the electronic camera 1 that, for instance, the free service period has expired and enables him to promptly perform the correct procedure to continue the service. Since the user does not need to find the correct procedure to follow by reading, for instance, the camera user manual, better user convenience is assured. This feature is bound to prove advantageous to the ISP as well, since ease of account registration is also likely to encourage more users to register with the ISP. Improved user convenience is likely to lead to increased sales for the manufacturer of the electronic camera.

It is to be noted that codes and messages that may be set in the display message list are not limited to those described above and by defining a plurality of other error codes based upon a pre-agreement reached by the ISP and the camera manufacturer or the like, setting optimal display messages in correspondence to the error codes and displaying the correct message on the display unit with the optimal timing, a further improvement in user convenience may be achieved.

(Wireless LAN Settings)

Next, a wireless LAN setting method that may be adopted in conjunction with the present invention is described. As explained earlier, an image photographed with the electronic camera 1 is transferred to the online album server 34 or the mail transmission server 35 via a wireless LAN connecting the electronic camera 1 with the public access point 31 or the home access point 32. In addition, the image may be transmitted to the PC 36 or the PC 37 with the electronic camera 1 and the home access point 32 connected with each other through a wireless LAN connection. The image may also be transmitted to the printer 42 by connecting the electronic camera 1 with the printer dongle 41 through a wireless LAN connection, whereas the image may be transmitted to the PC 51 by connecting the electronic camera 1 and the PC 51 through a wireless LAN connection. In order to establish such wireless LAN connections, information required to establish the wireless LAN connection must be pre-registered in the electronic camera 1.

The wireless LAN connection information registered in the electronic camera 1 includes access point information used to establish a connection with the public access point 31 and profile information used when establishing a connection with the home access point 32, the printer dongle 41 or the PC 51. The access point information and the profile information are stored in the memory 18 to ensure that they do not become erased when power to the electronic camera 1 is turned off.

As the access point information, information indicating the access point name assigned to the public access point 31, the SSID (service set identifier) of the wireless LAN, the IP address acquisition method, the authentication method, the type of encryption mode set for the authentication, the contents of the encryption key and the like is recorded. The user ID and the user password are dynamically generated by using the related information when authentication is requested, as explained earlier. It is to be noted that if the electronic camera 1 is allowed to connect with a plurality of public access points having different SSIDs, access point information corresponding to each accessible public connection point must be registered.

As the profile information, information indicating a specific profile name, the SSID of the wireless LAN, the IP address acquisition method, the authentication method, the type of encryption mode set for the authentication, the contents of the encryption key, the type of connection target device, the profile creation date/time, the most recent access date/time and the like is recorded. It is to be noted that if the electronic camera 1 is allowed to connect with a plurality of devices via a single access point, profile information corresponding to each device is registered. Namely, in the electronic camera 1 in the configuration shown in FIG. 1, profile information is registered in correspondence to each of the devices that may be connected to the electronic camera 1 via the home access point 32, i.e., the online album server 34, the mail transmission server 35, the PC 36, the PC 37 and the printer 38. In addition, profile information corresponding to the printer 42 and the PC 51 directly connected to the electronic camera rather than via the home access point 32 is also registered.

The access point information registration and the registration of the profile information except for the profile information corresponding to the printer 42 are both executed with the electronic camera 1 connected with the PC 36, 37 or 51 through a wired connection, i.e., via a cable. It is to be noted that profile information must be registered by connecting the corresponding PC to the electronic camera 1. Namely, when registering the profile information for the PC 36, the electronic camera 1 and the PC 36 must be connected with each other. In addition, when registering the profile information for the PC 37 or the printer 38, the electronic camera 1 and the PC 37 must be connected with each other, whereas when registering the profile information for the PC 51, the electronic camera 1 and the PC 51 must be connected with each other. For such profile information registration, the electronic camera 1 is connected to the cable via the external interface 23.

The following explanation is given by assuming that the user of the electronic camera 1 connected with the PC 36, 37 or 51 via the cable adjusts the mode dial to select a "setup" position. In response, a pre-installed wireless LAN setting software program is executed in the PC 36, 37 or 51. Consequently, various types of information including network setting information related to wireless LAN settings is transmitted to the electronic camera 1 from the PC 36, 37 or 51.

The control unit 17 in the electronic camera 1 executes specific processing so as to obtain the information originating from the PC 36, 37 or 51 and received via the cable and create access information or profile information based upon the contents of the information thus obtained. The access information or the profile information having been created is then written into the memory 18 for storage and thus becomes registered. Based upon the contents of the access information or the profile information, the wireless LAN module unit 24 executes wireless LAN connection processing for the electronic camera 1.

The profile information for the printer 42, however, is registered by wirelessly connecting the electronic camera 1 with the printer dongle 41 instead of connecting them via a cable. This wireless connection is established through a wireless LAN connection. The network setting information needed to establish the wireless LAN connection at this time is stored in advance in the wireless LAN module unit 24 as network setting information to be exclusively used to establish printer connection. Based upon this network setting information, the electronic camera 1 automatically assigns an IP address to itself and the wireless LAN module unit 24 and the printer dongle 41 become connected with each other in the ad hoc mode. Thus, the wireless LAN module unit 24 and the printer dongle 41 are connected without requiring wireless LAN authentication or data encryption.

Once the wireless LAN connection between the wireless LAN module unit 24 and the printer dongle 41 has been established, a specific message is brought up on display at the liquid crystal display unit 21. As the user operates a switch at the printer dongle 41 in response to the message, device information related to the printer 42 is transmitted from the printer dongle 41 to the electronic camera 1. Based upon the device information and the printer connection network setting information mentioned earlier, the electronic camera 1 creates a profile for the printer 41 and writes the profile thus created into the memory 18 for storage. The profile information for the printer 42 is registered in the electronic camera 1.

(Wireless LAN Connection)

Figure 16:
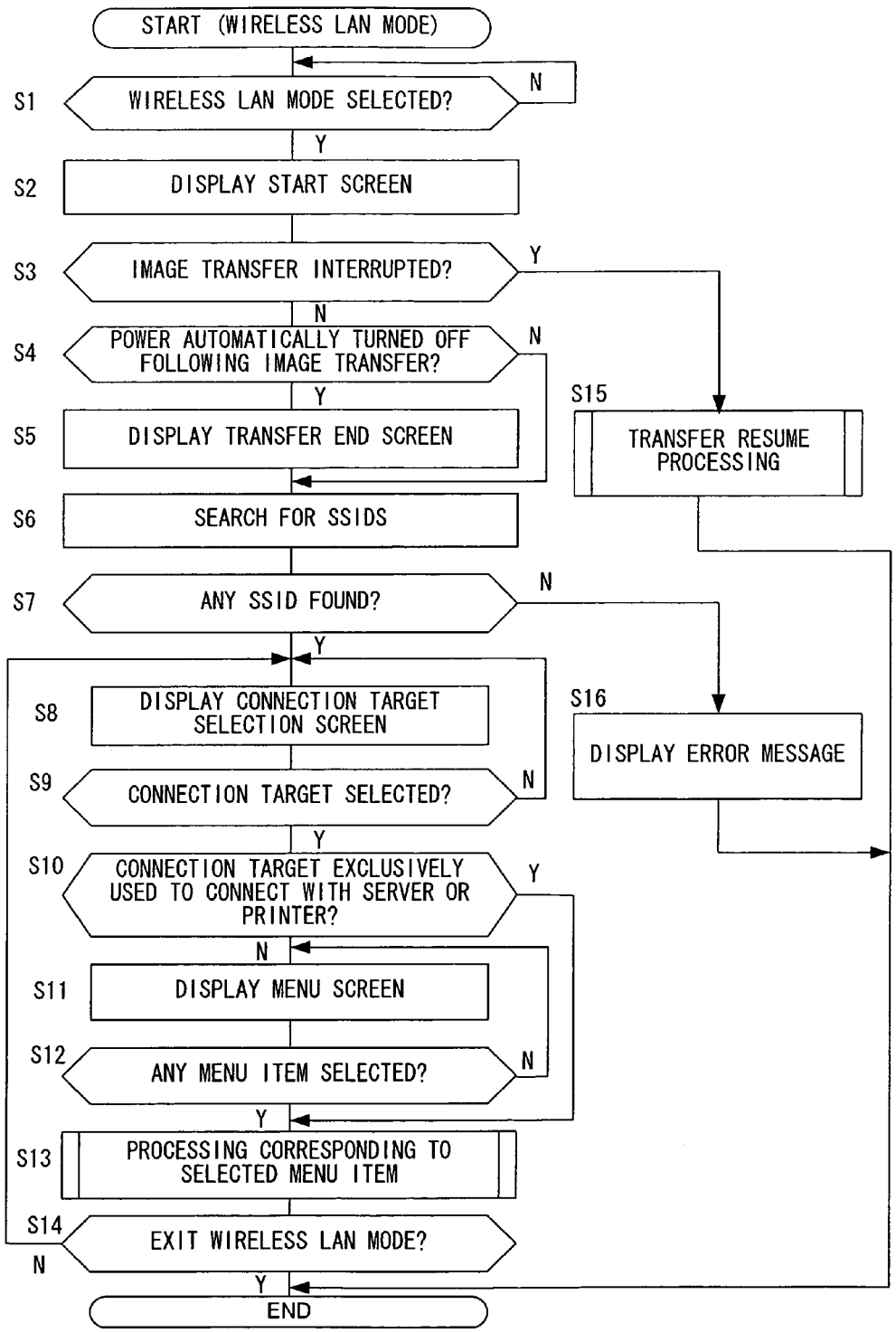

In reference to the flowchart presented in FIG. 16, the operation executed when transferring an image by connecting the electronic camera 1 with a specific connection target device through wireless LAN connection based upon the access point information or the profile information registered as described above is described. The flowchart presented in FIG. 16 shows the flow of the processing executed by the control unit 17 in the electronic camera 1 in response to a switchover to the wireless LAN mode at the electronic camera 1.

In step S1 in FIG. 16, a decision is made as to whether or not the wireless LAN mode has been selected in the electronic camera 1. The operation stays in step S1 until it is determined that the wireless LAN mode has been selected and once the wireless LAN mode has been selected, the operation proceeds to the following step S2. The decision is made in step S1 by checking the current setting at the mode dial which is part of the operation unit 16. If the user has operated the mode dial to adjust it to a "wireless LAN" setting position, it is decided that the wireless LAN mode has been selected and, accordingly, the operation mode in the electronic camera 1 is switched to the wireless LAN mode before the operation proceeds to step S2.

In step S2, a start screen indicating a wireless LAN mode execution start is brought up on display at the liquid crystal display unit 21. In step S3, a decision is made as to whether or not the immediately preceding image transfer was interrupted while in progress. If the image transfer is judged to have been interrupted, the operation proceeds to step S15 to execute transfer resume processing. The transfer resume processing is to be described in detail later in reference to the flowchart presented in FIG. 20. If it is decided that the image transfer was not interrupted, the operation proceeds to step S4.

In step S4, a decision is made as to whether or not power to the electronic camera has been automatically turned off following the immediately preceding image transfer. The electronic camera 1 has an auto power off function whereby the power is automatically turned off if no user operation is performed within a predetermined length of time, e.g., three minutes. If this auto power off function has been engaged and power to the electronic camera 1 has been turned off following the immediately preceding image, the operation proceeds from step S4 to step S5.

In step S5, a transfer end screen indicating that the immediately preceding image transfer has been completed successfully is brought up on display at the liquid crystal display unit 21. Once the processing in step S5 has been executed, the operation proceeds to step S6. If it is decided in step S4 that the power has not been turned off automatically, the operation proceeds directly to step S6 without executing step S5.

In step S6, an SSID search is executed to search for SSIDs corresponding to any access points, PCs and printers capable of carrying out wireless LAN communication with the wireless LAN module unit 24. While all the access points that may be connected in the infrastructure mode are search targets of the SSID search, the SSID search is executed to specifically search for printer dongles and PCs, the profile information of which is registered in the electronic camera. In addition, an access point may have a function of concealing its SSID from any wireless terminal at which the SSID of the particular access point is not set. The search for such a concealed SSID is executed based upon the SSID information registered in the access point information or the profile information. In other words, only access points with SSIDs registered in the access point information or the profile information are targets of the SSID search. As the operation mode is switched to the wireless LAN mode at the electronic camera 1, the electronic camera searches for access points, printer dongles and the like capable of wirelessly communicating with the wireless LAN module unit 24, as described above.

In step S7, a decision is made as to whether or not any SSID has been found through the SSID search executed in step S6. If it is decided that no SSID corresponding to a connection target device capable of communicating with the electronic camera has been found through the search, the operation proceeds to step S16. In this case, an error message is brought up on display at the liquid crystal display unit 21 in step S16, and then the processing in the flowchart presented in FIG. 16 ends. If it is decided that at least one SSID has been found through the search, the operation proceeds to step S8.

In step S8, a connection target selection screen in which a connection target device to connect with the electronic camera 1 is selected, is brought up on display at the liquid crystal display unit 21. In the connection target selection screen, a list of SSIDs corresponding to the access points, the PCs and printers having been found through the search executed in step S6 is displayed. It is to be noted that a rectangular frame is displayed beside each of the SSID listed in the connection target selection screen. The rectangular frame takes on a specific color corresponding to the SSID type so as to enable the user to identify the type of the particular SSID with ease. For instance, a rectangular frame displayed beside an SSID that is not registered in either access point information or profile information may be black. In addition, the rectangular frame displayed beside an SSID registered in profile information may be green, whereas the rectangular frame displayed beside an SSID registered in access point information may be orange. It is to be noted that the colors of the rectangular frames displayed beside the different types of SSIDs as described above are examples and different colors may be used instead. As an alternative, different graphics or the like may be displayed beside different types of SSIDs so as to enable the user to identify the individual types of SSIDs.

In addition, as the cursor is moved to a specific SSID in the connection target selection screen, a function icon indicating a specific function that may be engaged as the electronic camera 1 is connected to the connection target corresponding to the particular SSID is brought up on display near the bottom of the screen. There is a total of three function icons that may be brought up on display in the connection target selection screen; a PC connection function icon, a printer connection function icon and a server connection function icon. As long as the cursor is set over an SSID registered either in access point information or profile information, at least one of the three function icons shall be brought up on display. However, if the cursor is set over an unregistered SSID, no function icon is brought up on display since any function that may be engaged by connecting with the device corresponding to the particular SSID is not known.

If a help button is pressed in the connection target selection screen, a connection target information screen is brought up on display. In the connection target information screen, the profile name of a device corresponding to the SSID over which the cursor is placed is displayed. It is to be noted that if a plurality of devices are connected corresponding to the wireless LAN with the SSID, the profile names of all the devices are displayed. If all the profile names may not be displayed in a single screen page, any excess profile names may be viewed by operating a direction button to scroll down the screen. As the help button is pressed again, the display returns to the connection target selection screen.

In addition, as the menu button is pressed in the connection target selection screen, a wireless LAN setting screen is brought up on display. In the wireless LAN setting screen, a mail address and a nickname may be set, or a specific wireless print setting may be selected. A mail address is set by bringing up on display a mail address entry screen. The user enters his mail address in the mail address entry screen to register the sender's mail address. It is to be noted that if the help button is pressed in the mail address entry screen, a mail address verify screen used to verify the mail address having entered is brought up on display.

A nickname is set by bringing up on display a nickname entry screen. The user enters his nickname in the nickname entry screen to register the sender's nickname. It is to be noted that if the help button is pressed in the nickname entry screen, a nickname verify screen used to verify the nickname having entered is brought up on display.

When the electronic camera 1 transfers an image to the mail transmission server 35 the nickname and mail address of the sender having been registered as described above are transmitted together with the image from the electronic camera 1 to the mail transmission server 35. The sender's nickname and mail address are then used at the mail transmission server 35 when it creates a viewing page or a notice mail.

A specific wireless print setting is selected by registering the profile information through a procedure such as that described earlier. Namely, assuming that the wireless print setting for the printer 42 is to be selected, the electronic camera 1 and the printer dongle 41 first attempt to establish a wireless LAN connection in the ad hoc mode. At this time, a printer connection screen is brought up on display. Once a wireless LAN connection between the electronic camera 1 and the printer dongle 41 has been established, a pairing verify screen is brought up on display. As the user, prompted by a message in the paring verify screen, presses a switch at the printer dongle 41, the device information on the printer 42 is transmitted from the printer dongle 41 to the electronic camera 1. The electronic camera 1, having received the device information, registers the profile of the printer 42 accordingly. Once the profile registration for the printer 42 has been completed, a printer connection setting complete screen is brought up on display. As a connection with the printer 42 is selected in this screen, the electronic camera 1 becomes connected with the printer 42 and wireless print processing starts.

In step S9 following step S8, a decision is made as to whether or not a connection target to be connected with the electronic camera 1 has been selected in the connection target selection screen brought up on display in step S8. If one of the SSIDs listed in the connection target selection screen brought up on display in step S8 is selected in response to a user operation, the access point, the printer dongle or the PC corresponding to the particular SSID is selected as the connection target to be connected with the electronic camera 1. Until a specific connection target to be connected with the electronic camera 1 is selected, the operation repeatedly returns to step S8 to continuously hold a connection target selection screen on display and once a connection target has been selected, the operation proceeds to step S10.

In step S10, a decision is made as to whether or not the connection target determined to have been selected in step S9 is used exclusively in conjunction with a server or a printer. For instance, the public access point 31 is a connection target exclusively used to connect with either the online album server 34 or the mail transmission server 35. In addition, the printer dongle 41 is a connection target exclusively used to connect with the printer 42. Accordingly, if the SSID corresponding to either of these connection targets has been selected by the user in the connection target selection screen, the connection target is determined to be a connection target exclusively used to connect with a server or exclusively used to connect with a printer, and the operation proceeds to step S13. The home access point 32 is connected with the online album server 34 or the mail transmission server 35 and is also connected with the PCs 36 and 37 and the printer 38. In addition, the PC 51 is a connection target selected simply to connect with the PC 51. Accordingly, if an SSID corresponding to any of these connection targets has been selected by the user in the connection target selection screen, it is decided that the selected connection target is not exclusively used to connect with a server or a printer and the operation proceeds to step S11.

In step S11, a menu screen corresponding to the connection target determined to have been selected in step S9 is brought up on display. A list of various menu items that may be executed by connecting the electronic camera 1 to the connection target is displayed in the menu screen. Namely, if the home access point 32 has been selected, a list of menu items, each selected to transfer the image to the online album server 34, the mail transmission server 35, the PC 36, the PC 37 or the printer 38 is displayed. If the PC 51 has been selected, a list of menu items that may be selected to transfer an image to the PC 51 is brought up on display.

It is to be noted that the online album server 34, the mail transmission server 35, the PC 36, the PC 37 and the printer 38 are connected to the home access point 32. However, an access point assuming a network connection mode other than this may be selected as the connection target. In such a case, the contents of the menu screen brought up on display in step S11 is adjusted in correspondence to the network connection mode adopted in the selected access point.

More specifically, the list of menu items displayed in the menu screen when the selected access point is connected with a server is different from the list of menu items displayed in the menu screen when the selected access point is not connected with a server. Namely, if an access point that is not connected with either the online album server 34 or the mail transmission server 35 via the Internet 33 is selected, the menu item to be selected to transfer the image to either server is not required and, accordingly, the menu item is not displayed in the menu screen. Likewise, if the selected access point is not connected to a PC or a printer, superfluous menu items corresponding to the PC and the printer are not displayed in the menu screen. Thus, a menu item list with different contents is displayed in the menu screen depending upon whether or not the selected access point is connected to a PC or a printer, The decision with regard to the network connection mode adopted at the access point is made based upon either access point information or profile information. Namely, if access point information is registered, the public access point corresponding to the particular access point information may be judged to be connected only with the online album server 34 or the mail transmission server 35. If profile information is registered, a specific device connected to an access point corresponding to each SSID may be determined based upon the connection target device type indicated in the profile information and the wireless LAN SSID information.

In step S11, any one of various menu screens may be displayed. The menu screen brought up on display after an access point connected with a server a PC and a printer, such as the home access point 32, is selected as the connection target may include, for instance, a menu item "connect with server" to be selected to transfer the image to either the online album server 34 or the mail transmission server 35, a menu item to be selected to transfer the image to the PC and a menu item "wireless print" to be selected to transfer the image to the printer. The menu item selected to transfer the image to the PC may include sub menu items such as "standard transfer (with background music)", "standard transfer (without background music)", "photographing date-specified transfer", "manually selected image transfer", "post-photographing operation auto-transfer", "automatically selected image transfer" and "PC initiated transfer". The menu screen may be switched by pressing the upward-direction button or the downward-direction button. The same principle applies to the various menu screens to be described below.

The menu screen brought up on display after an access point connected with a server and a PC is selected as the connection target includes the individual menu items described above except for the menu item to be selected to transfer the image to a printer. The menu screen brought up on display after an access point connected with a server and a printer is selected as the connection target includes the individual menu items described above except for the menu item to be selected to transfer the image to a PC.

The menu screen brought up on display after an access point connected with a PC and a printer is selected as the connection target includes the individual menu items described above except for the menu item to be selected to transfer the image to a server. In the menu screen brought up on display after an access point connected only with a PC or a PC to be connected in the ad hoc mode is selected as the connection target, the various sub menu items described earlier, one of which is to be selected for the image transfer to the PC, are displayed.

It is to be noted that since the menu screen brought up on display when a connection target exclusively used to establish a connection with a server is selected would need to display only a single menu item, i.e., "connect with server" to be selected to transfer an image to the server, and that the menu screen brought up on display when a connection target exclusively used to establish a connection with a printer is selected would need to display only a single menu item, i.e., "wireless print", to be selected to transfer the image to the printer. Thus, no menu screen needs to be displayed at all, since it would only include a single menu item. Accordingly, as has been explained in reference to step S10, the operation proceeds to step S13 without displaying a menu screen in step S11. As a result, a superfluous menu screen display is omitted.

In step S12, a decision is made as to whether or not any menu item has been selected in the menu screen brought up on display in step S11. Until a specific menu item is selected, the operation repeatedly returns to step S11 to continuously hold the menu screen on display and once a menu item has been selected, the operation proceeds to step S13.

In step S13, the processing corresponding to the menu item judged to have been selected in step S12 is executed. Through this processing, the image is transferred from the electronic camera 1 to the recipient among the various servers, PCs and printers, which corresponds to the selected menu item. The processing executed in this step is to be described in detail later.

In step S14, a decision is made as to whether or not to exit the wireless LAN mode. If it is decided that the operation is to exit the wireless LAN mode, the processing in the flowchart presented in FIG. 16 ends. However, if it is decided that the wireless LAN mode is to be sustained, the operation returns to step S8, in which the connection target selection screen is brought up on display again. The decision is made in step S14 based upon the result of a user operation at the mode dial performed after the processing in step S13 is executed. Namely, if the mode dial remains at the "wireless LAN" setting, it is decided that the wireless LAN mode is to be sustained, whereas if the mode dial is switched to another position, it is decided that the operation is to exit the wireless LAN mode.

As the processing described above is executed in the wireless LAN mode, an image originating from the electronic camera 1 is transferred.

(Image Transfer to the Online Album Server)

Figure 17:
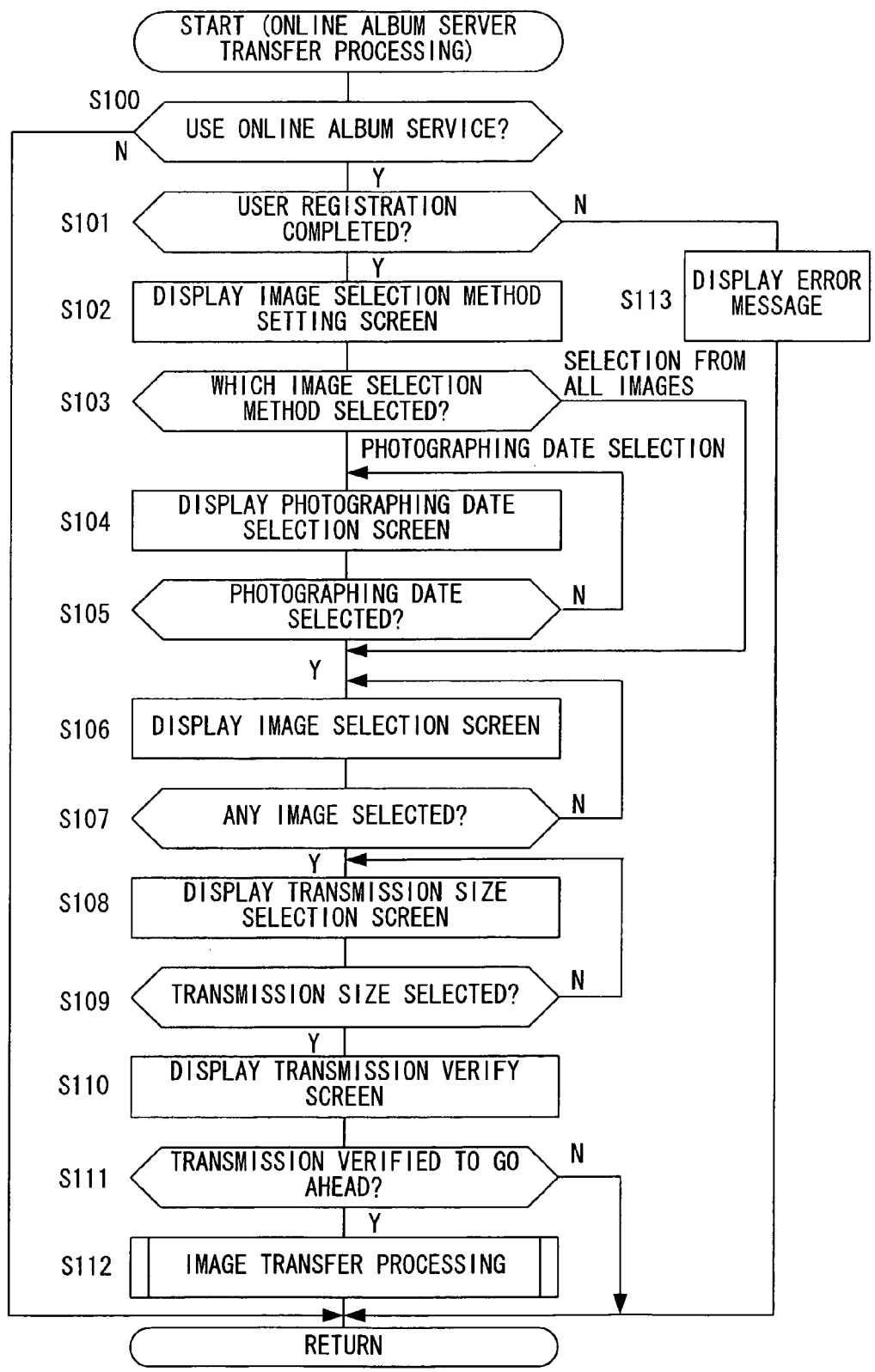

Next, the processing executed in step S13 in FIG. 16 is described in specific detail. First, the online album server transfer processing executed to transfer the image to the online album server 34 is described in reference to the flowchart presented in FIG. 17. The processing in the flowchart presented in FIG. 17 is executed as the menu item "connect with server" is selected in the menu screen described earlier.

In step S100, a decision is made as to whether or not the online album service is to be used. If it is decided that the online album service is to be used, the operation proceeds to the following step S101. However, if it is decided that the online album service is not to be used, i.e., if it is decided that the mail transmission service is to be used, the processing in the flowchart presented in FIG. 17 ends. In this case, mail transmission server transfer processing, such as that shown in the flowchart presented in FIG. 19, in reference to which an explanation is to be given later, is executed. It is to be noted that either service is selected through a method such as that explained earlier.

In step S101, a decision is made as to whether or not user registration with the online album server 34 has been completed. If the user is registered, the operation proceeds to the following step S102, whereas if the user is not registered, the operation proceeds to step S113. The decision may be made in step S101 by referencing flag information set in the electronic camera 1 in response to user registration. In step S113, an error message is brought up on display at the liquid crystal display unit 21 before ending the processing in the flowchart presented in FIG. 17. In this case, the image is not transferred to the online album server 34. It is to be noted that while the processing is described by assuming that an image may not be transferred to the online album server 34 without first completing the user registration, the present invention may be adopted in a system that allows an image to be transferred to the online server 34 without requiring any such registration, and in this case, the processing in steps S101 and S113 shall be skipped.

In step S102, an image selection method setting screen that allows the user to set a specific method with which an image to be transferred from the electronic camera 1 is selected, is brought up on display at the liquid crystal display unit 21. The image selection method setting screen lists items "select from all images" and "select photographing date". In step S103, a decision is made as to which image selection method, i.e., either "select from all images" or "select photographing date", has been selected by the user in the image selection method setting screen brought up on display in step S102. If "select from all images" has been selected, the operation proceeds to step S106, whereas the operation proceeds to step S104 if "select photographing date" has been selected.

In step S104, a photographing date selection screen in which a specific photographing date on which a transfer target image was photographed is selected is brought up on display at the liquid crystal display unit 21. The photographing date selection screen displays a list of all the photographing dates on which the photographic images recorded in the electronic camera 1 were photographed. It is desirable that one of the photographic images photographed on each photographing date be designated as a representative image and that the list of photographing dates include a thumbnail image created by reducing the representative image displayed together with each photographing date. The thumbnail images displayed in the photographing date selection screen remind the user of the type of images having been photographed on the various photographing dates and thus facilitates selection of a photographing date.

In step S105, a decision is made as to whether or not a specific photographing date has been selected in response to a user operation performed in the photographing date selection screen brought up on display in step S104. Until a photographing date is selected, the operation repeatedly returns to step S104 to hold the photographing date selection screen on display. Once a photographing date has been selected by the user and the confirm button has been pressed, the operation proceeds to the following step S106.

In step S106, an image selection screen, in which a transfer target image is selected, is brought up on display at the liquid crystal display unit 21. The image selection screen provides an at-a-glance display of thumbnail images created by reducing the photographic images recorded in the electronic camera 1. If "select photographing date" has been selected as the image selection method, an at-a-glance display of thumbnail images corresponding to the photographic images having been photographed on the photographing date selected in step S105 is displayed. However, if "select from all images" has been selected as the image selection method, an at-a-glance display of the thumbnail images of all the photographic images stored in the electronic camera 1 is displayed.

In step S107, a decision is made as to whether or not the user has selected an image by performing a specific operation in the image selection screen brought up on display in step S106. Until an image is selected, the operation repeatedly returns to step S106 to hold the image selection screen on display. Once an image has been selected by the user and the confirm button has been pressed, the operation proceeds to the following step S108.

In step S108, a transmission size selection screen, in which the image size for the transfer target image is selected, is brought up on display at the liquid crystal display unit 21. In the transmission size selection screen listing various transmission sizes such as "print size", which is an optimal image size for printing, "PC size", which is an optimal image size for display at a computer monitor, "TV size", which is an image size optimal for display on a television and "original", indicating the original image size, the user selects a specific image size. When the image is transferred from the electronic camera 1 to the online album server 34, the image size is converted so as to match the transmission size selected in this step.

It is to be noted that among the four different image size settings, "print size", "PC size" and "TV size" each indicate an image size smaller than the original image size. In other words, if the user selects any one of these three image sizes, the image data are converted so as to assume an image size smaller than the original image size. Thus, if the user selects a smaller image size, the capacity at the online album server 34 shall not be used up significantly. However, if the user selects "original" indicating the original image size, the initial image size remains unaltered. Thus, whenever necessary, the user is able to transfer a photographic image retaining its initial quality.

In step S109, a decision is made as to whether or not a specific transmission size has been selected in response to a user operation performed in the transmission size selection screen brought up on display in step S108. Until a transmission size is selected, the operation repeatedly returns to step S108 to hold the transmission size selection screen on display. Once the user selects a transmission size, the operation proceeds to the following step S110.

In step S110, a transmission verify screen, prompting the user to confirm that the transfer of the selected image may start is brought up on display at the liquid crystal display unit 21. In the following step S111, a decision is made as to whether or not the user's transmission verify response indicates "OK" based upon the result of the user operation performed in the transmission verify screen brought up in step S110. If the transmission verify response indicates OK, i.e., if the user has selected "YES" in the transmission verify screen, the operation proceeds to step S112. Otherwise, i.e., if the user has selected "NO" in the transmission verify screen, the processing in the flowchart presented in FIG. 17 ends without executing step S112. In this case, no image transfer to the online album server 34 is executed.

In step S112, image transfer processing is executed to transfer the selected image. Once the image transfer processing is underway, the electronic camera 1 and the online album server 34 are connected via the wireless LAN and the image selected by the user is transferred from the electronic camera 1 to the online album server 34. The image transfer processing is to be described in specific detail later in reference to the flowchart presented in FIG. 18. Once step S112 has been executed, the processing in the flowchart presented in FIG. 17 ends.

Figure 18:
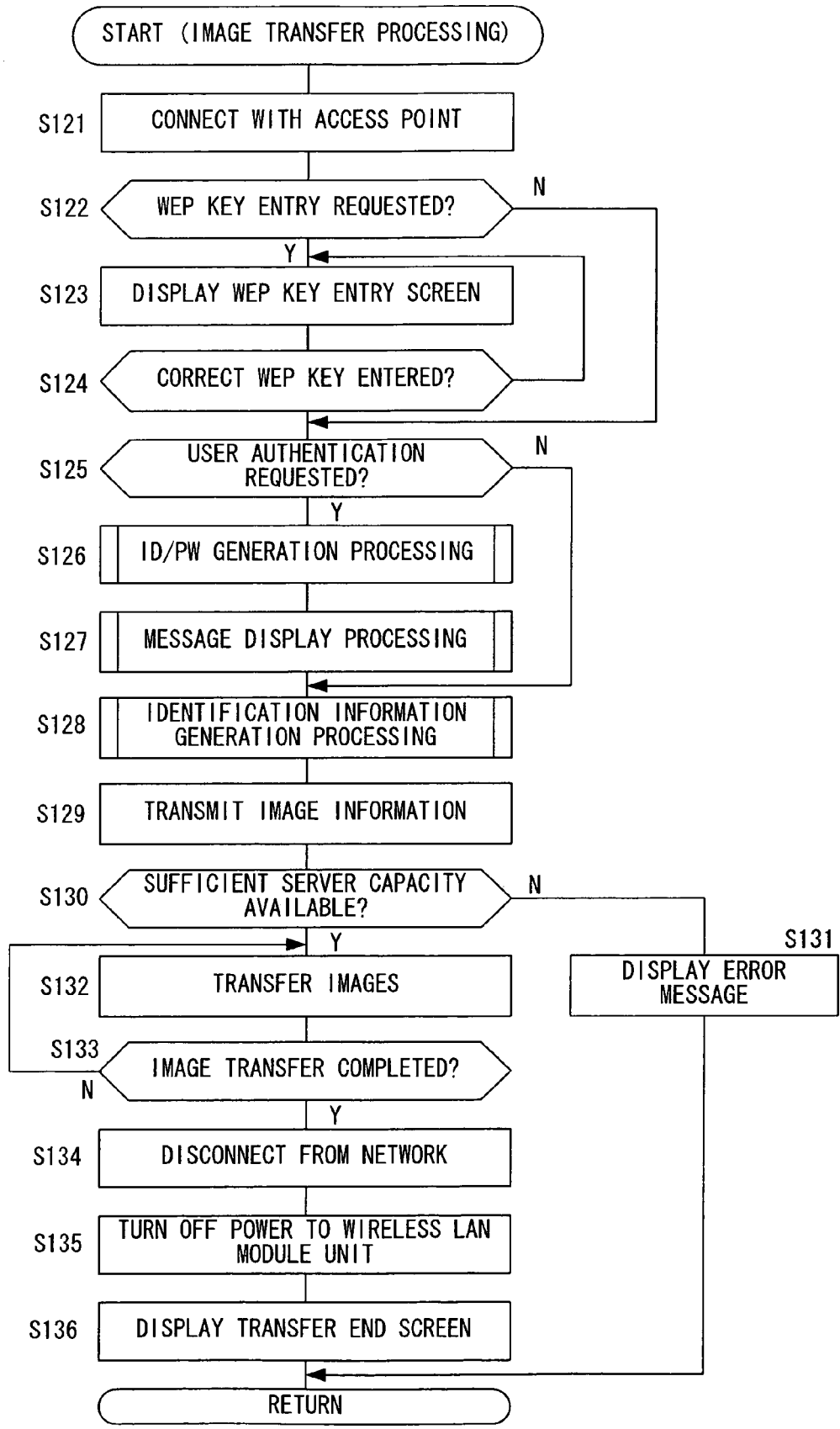

The image transfer processing executed in step S112 in FIG. 17 is now described in further detail in reference to the flowchart presented in FIG. 18. In step S121, the wireless LAN module unit 24 starts wirelessly communicating with the access point corresponding to the connection target determined to have been selected by the user in step S9 in FIG. 16, so as to establish a connection with the access point. At this time, an access point connection screen indicating that the electronic camera is being connected with the access point is brought up on display. The electronic camera 1 is thus connected either with the public access point 31 or the home access point 32 via the wireless LAN.

In step S122, a decision is made as to whether or not the access point to which the electronic camera has been connected in step S121 has requested that a WEP (wired equivalent privacy) key, i.e., an encryption key required to authorize connection to the access point be entered. It is to be noted that the access point may request entry of an encryption key adopting an encryption format other than the WEP. The operation proceeds to step S123 if a WEP key entry has been requested, but the operation proceeds to step S125 otherwise.

In step S123, a WEP key entry screen, in which a WEP key may be entered is brought up on display at the liquid crystal display unit 21. The user is able to enter any WEP key in the electronic camera 1 by operating, for instance, the direction buttons or the like in the WEP key entry screen. It is to be noted that if the help button is pressed at this time, a WEP key verify screen is brought up on display. The user is able to verify the WEP key he has entered in the WEP key verify screen.

In step S124, a decision is made as to whether or not the user has entered the correct WEP key in the WEP key entry screen brought up on display in step S123. Until the correct WEP key is entered, the operation repeatedly returns to step S123 to hold the WEP key entry screen on display. Once the correct WEP key has been entered, the operation proceeds to step S125. The WEP key is authenticated through this process. It is to be noted that the WEP key entry may be canceled by pressing a cancel button during this process.

It is also to be noted that if the correct WEP key corresponding to the particular access point has been previously entered, the contents of the WEP key shall already be stored in the electronic camera 1. Accordingly, the decision in step S124 may be made based upon the stored WEP key to authenticate the WEP key without displaying the WEP key entry screen, even if the access point has requested a WEP key entry. Likewise, if the contents of the WEP key are stored in access point information or profile information, the WEP key is authenticated by checking the WEP key in the information without bringing up the WEP key entry screen on display.

In step S125, a decision is made as to whether or not the access point to which the electronic camera has attempted connection in step S121 requires user authentication in order to authorize the connection with the access point. The access point 31 in the embodiment is operated by an ISP that allows only authorized users, e.g., users having completed user registration in advance or users granted access over a limited period of time, to connect and thus requires user authentication. However, some access points offer free access to anyone without requiring user registration and if the access point to which the camera has been connected in step S121 is such a free access point, no user authentication is required. The operation proceeds to step S126 if user authentication is deemed necessary but the operation proceeds to step S128 if user authentication is deemed unnecessary.

In step S126, the ID/PW generation processing is executed as shown in the flowchart presented in FIG. 7. While a detailed explanation of this processing, having already been given, is not provided, the user ID and a user password are dynamically generated through the ID/PW generation processing and an authentication request message containing the user ID and password thus generated is transmitted to the authentication server 39.

It is to be noted that upon receiving the authentication request message, the authentication server 39 executes the authentication processing shown in the flowchart presented in FIG. 10 as described earlier and an authentication response message indicating whether or not the user has been successfully authenticated, and also containing a specific error code if user authentication has been denied for a specific reason (the free service period has expired in the embodiment) is transmitted to the electronic camera 1.

Upon receiving the response message, the message display processing is executed in step S127 as shown in the flowchart presented in FIG. 14. While a detailed explanation of this processing, having already been given, is not provided, a message prompting user registration is brought up on display at the liquid crystal display unit 21 of the electronic camera 1 if the authentication has been denied at the authentication server 39 for a specific reason. It is to be noted that if the user is judged to have been successfully authenticated in step S52 in FIG. 14, the connection with the access point is completed and the operation proceeds to the following step S128. Through this process, the electronic camera 1 becomes connected via the wireless LAN with the online album server 34 or the mail transmission server 35 having been selected as the image transfer recipient. If the user authentication is judged to have been denied in step S52 in FIG. 14, the processing in FIG. 18 ends.

It is to be noted that if the user is a registered user or is authorized to use the access point and has a valid user ID and password, the user ID/password entry screen may be brought up on display to prompt the user to enter the user ID and the user password, instead of executing the processing in steps S126 and S127.

Next, in step S128, the identification information generation processing is executed as shown in the flowchart presented in FIG. 4. While a detailed explanation of this processing, having already been given, is not provided, identification information (device identification information in this case) is dynamically generated and the identification information thus generated is set in a request message through this processing. It is to be noted that the identification information generated through the processing is set in all request messages to be transmitted from the electronic camera 1 to the Internet 33.

Identification information set in the request message allows the electronic camera to be identified as a specific device unit and, accordingly, the transfer recipient server (the online album server 34 or mail transmission server 35) is able to authenticate the user based upon the identification information. In other words, access by another camera, a portable telephone or the like which does not provide such identification information may be effectively prevented. For instance, even when the user is accessing the server by connecting with the Internet via an access point or the like having been judged in step S125 to not require user authentication, the electronic cameral may still be identified correctly and the service may be provided to the user without difficulty.

In the following step S129, image information indicating the number of transfer target images, the transmission size and the like is transmitted to the transfer recipient server. Based upon the image information, the transfer recipient server makes a decision as to whether or not the available capacity at the server is sufficient. It is to be noted that a specific server capacity available to each user is allocated in advance at the transfer recipient server. For instance, each user of the online album server 34 may be allowed to accumulate images in his online album taking up memory space up to 100 MB. The available server capacity allocated to each user may be increased up to, for instance, 1 GB if the user performs a predetermined procedure. In addition, each user of the mail transmission server 35 may be allowed to accumulate images in his viewing page taking memory space up to 100 MB. When a predetermined period of time, e.g., two weeks, elapses, the viewing page is automatically erased by the mail transmission server 35.

In step S130, a decision is made based upon the result of the decision made at the transfer recipient server with regard to the server capacity by checking the image information having been transmitted in step S131 as to whether or not sufficient server capacity is available. If the transfer recipient server has judged that sufficient server capacity is not available, the operation proceeds to step S131 to display an error message at the liquid crystal display unit 21 before ending the processing in the flowchart presented in FIG. 18. If the transfer recipient server has judged that there is sufficient server capacity available, the operation proceeds to step S132.

In step S132, each image having been selected as a transfer target image in step S107 in FIG. 17 described earlier or in step S208 in FIG. 19 to be described later is transferred. At this time, a specific transfer status report screen indicating the total number of transfer target images and the number of images having been transferred is brought up on display. In the following step S133, a decision is made as to whether or not the image transfer has been completed. Until all the transfer target images are transferred, the operation repeatedly returns to step S132 to continuously transfer images and once the image transfer ends, the operation proceeds to step S134.

In step S134, the connection between the electronic camera 1 and the Internet 33 is terminated. At this time, the wireless LAN module unit 24 terminates the wireless communication with the access point having been selected as the connection target. As a result, the wireless LAN connection having been established for the electronic camera 1 and the access point is turned off. In the following step S135, the power supply to the wireless LAN module unit 24 stops, thereby turning off the power to the wireless LAN module unit 24. In the following step S136, a transfer end report screen indicating that the image transfer has been completed is brought up on display at the liquid crystal display unit 21. Once step S136 has been executed, the processing in the flowchart presented in FIG. 18 ends.

Through the processing described above, the electronic camera 1 is connected with the online album server 34 or the mail transmission server 35 via the wireless LAN. Then, images selected by the user are transferred from the electronic camera 1 to the online album server 34 or the mail transmission server 35. It is to be noted that if the cancel button is pressed before the image transfer has been completed, a specific cancellation report screen is brought up on display and then the processing in the flowchart presented in FIG. 18 ends.

Image transfer to the mail transmission server

Figure 19:
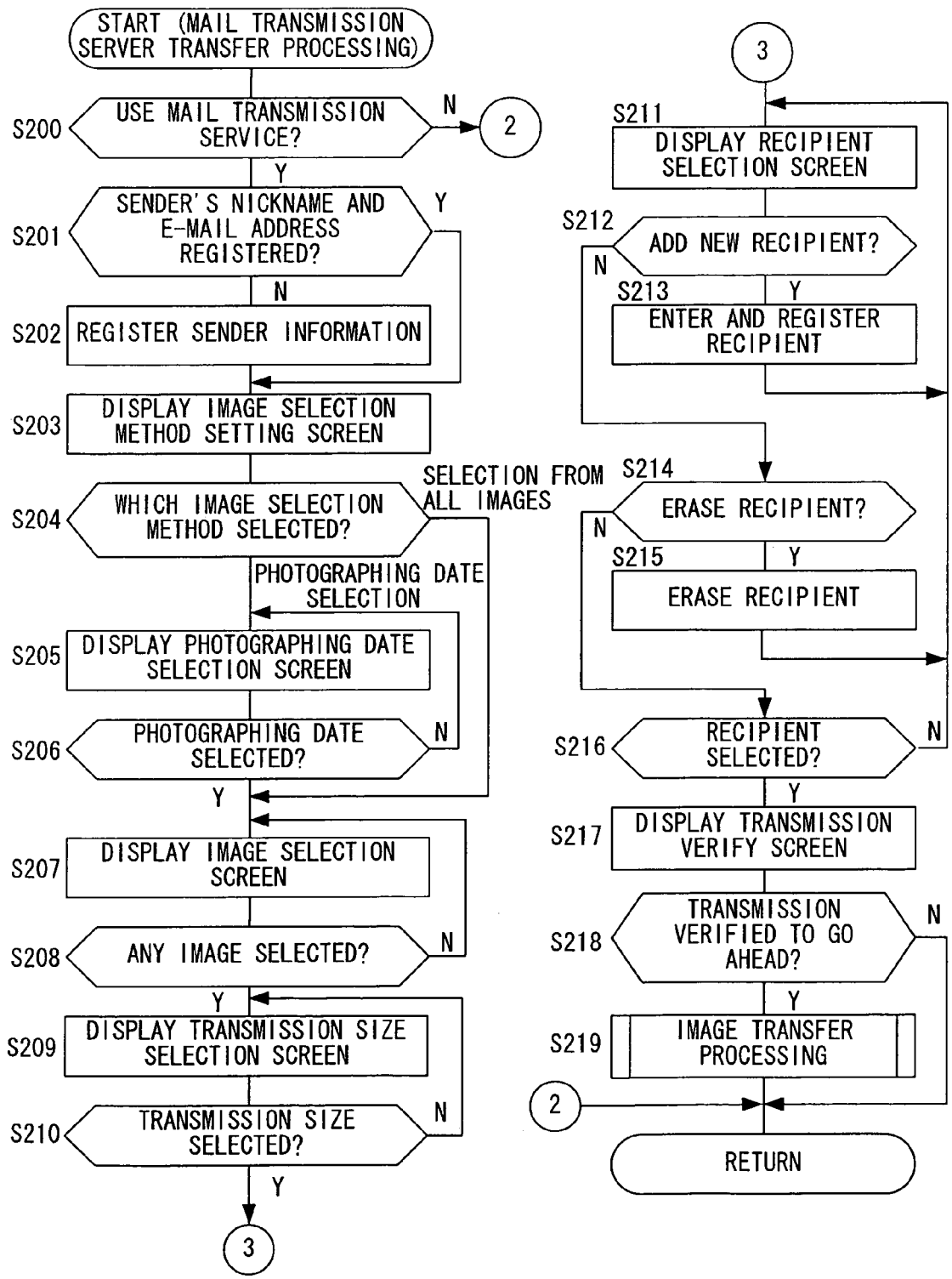

Next, the mail transmission server transfer processing, executed in step S13 in FIG. 16 to transfer the image to the mail transmission server 35, is described in detail in reference to the flowchart presented in FIG. 19. The processing in the flowchart presented in FIG. 19 is executed as the menu item "connect with server" is selected in the menu screen.

In step S200, a decision is made as to whether or not the mail transmission service is to be used. If it is decided that the mail transmission service is to be used, the operation proceeds to the following step S201. However, if it is decided that the mail transmission service is not to be used, i.e., if it is decided that the online album service is to be used, the processing in the flowchart presented in FIG. 19 ends. In this case, the online album server transfer processing shown in the flowchart presented in FIG. 19, in reference to which an explanation has been given earlier, is executed. As in step S100 in FIG. 17, a decision as to which service is to be used is made in step S200 through a method such as that explained earlier.

In step S201, a decision is made as to whether or not sender information indicating a nickname and an e-mail address of the user sending the image has already been registered in the electronic camera 1. The sender information is registered by the user as he enters his e-mail address and nickname in the e-mail address entry screen and the nickname entry screen brought up on display from the wireless LAN setting screen, as described earlier. If sender information has been registered, the operation proceeds to step S203, whereas if no sender information has been registered, the operation proceeds to step S202.

In step S202, sender information is registered. At this time, a sender information entry screen is first brought up on display. As the user selects "enter" in this screen, the e-mail address entry screen is brought up on display. The user registers an e-mail address in the sender information by entering his e-mail address in the e-mail address entry screen. It is to be noted that if the help button is pressed in the e-mail address entry screen, an e-mail address verify screen, in which the entered e-mail address may be verified, is brought up on display.

Once the e-mail address registration is completed, the nickname entry screen is brought up on display. The user is able to register a nickname in the sender information by entering his nickname in the nickname entry screen. It is to be noted that if the help button is pressed in the nickname entry screen, a nickname verify screen, in which the entered nickname may be verified, is brought up on display. Once the nickname and the e-mail address have been registered as the sender information, the operation proceeds to step S203.

As described above, if the user issues an instruction for an image transfer to the mail transmission server 35 before sender information is registered in the electronic camera 1, the operation proceeds from step S201 to step S202 to bring up on display the sender information entry screen to prompt the user to register sender information. Then, once the sender information has been registered, the operation proceeds to step S203 to execute the subsequent processing. Namely, unless sender information is registered, the image transfer to the mail transmission server 35 is prohibited. It is thus ensured that the sender information required by the mail transmission server 35 to create a viewing page is transmitted from the electronic camera 1 attempting the image transfer to the mail transmission server 35 with a high level of reliability.

In steps S203~S210, processing similar to that executed in steps S102~S109 in FIG. 17 is executed. Namely, in step S203, the image selection method setting screen is brought up on display at the liquid crystal display unit 21. In step S204, a decision is made as to which image selection method, i.e., either "select from all images" or "select photographing date", has been selected by the user in the image selection method setting screen brought up on display in step S203. If "select from all images" has been selected, the operation proceeds to step S207, whereas the operation proceeds to step S205 if "select photographing date" has been selected. In step S205, the photographing date selection screen is brought up on display at the liquid crystal display unit 21. In step S206, a decision is made as to whether or not a specific photographing date has been selected in the photographing date selection screen brought up on display in step S205. Until a photographing date is selected, the operation repeatedly returns to step S205 to hold the photographing date selection screen on display. Once a photographing date has been selected, the operation proceeds to the following step S207. In step S207, the image selection screen is brought up on display at the liquid crystal display unit 21. In step S208, a decision is made as to whether or not the user has selected an image by performing a specific operation in the image selection screen brought up on display in step S207. Until an image is selected, the operation repeatedly returns to step S207 to hold the image selection screen on display. Once an image has been selected, the operation proceeds to step S209.

In step S209, a transmission size selection screen is brought up on display at the liquid crystal display unit 21. It is to be noted that unlike in the transmission size selection screen brought up on display in step S108 in FIG. 17, "original" indicating the original image size may not be selected in the transmission size selection screen brought up on display in step S209. These measures are taken to ensure that the user is not able to specify the original image size when transferring images to the mail transmission server 35. Since, no image may be transferred from the electronic camera 1 in the original image size with a large data volume, the available server capacity is conserved.

It is to be noted that the transmission size selection screen brought up when transferring images to the online album server 34, too, may not allow the user to select the original image size, to achieve a similar advantage. Namely, the available memory space at least at either the online album server 34 or the mail transmission server 35 may be utilized efficiently without using up the available server capacity quickly, by not allowing the user to specify the original image size when transferring images to the particular server.

In step S210, a decision is made as to whether or not a specific transmission size has been selected in the transmission size selection screen brought up on display in step S209. Until a transmission size is selected, the operation repeatedly returns to step S209 to hold the transmission size selection screen on display. Once the user selects a transmission size, the operation proceeds to the following step S211.

In step S211, a recipient selection screen in which a specific mail recipient may be selected is brought up on display at the liquid crystal display unit 21. The recipient selection screen brought up on display in this step displays a list of nicknames of registered friends and acquaintances, corresponding to e-mail addresses that may be selected. The user selects a specific e-mail address by selecting the corresponding nickname. It is to be noted that a recipient verify screen may be brought up on display by pressing the help button. In the recipient verify screen, the nickname and the e-mail address of the recipient under the cursor are displayed.

In step S212, a decision is made as to whether or not new recipient information is to be added. It is decided that new recipient information is to be added if the cursor is moved to "add new contact" and the confirm button is pressed in the recipient selection screen brought up on display in step S211. In this case, the operation proceeds to step S213. If it is decided that no recipient information is to be added, the operation proceeds to step S214.

In step S213, the new recipient information is entered and registered. At this time, a recipient nickname entry screen is first brought up on display. The user enters the nickname of a friend or acquaintance to be added as a new recipient by operating the direction buttons or the like in the recipient nickname entry screen. It is to be noted that a recipient nickname verify screen may be brought up on display by pressing the help button at this time. The user is able to verify the recipient nickname he has entered by checking the recipient nickname verify screen.

Once the recipient nickname entry is completed, a recipient e-mail address entry screen is brought up on display. The user enters the e-mail address of a friend or acquaintance to be added as a new recipient in the recipient e-mail address entry screen. It is to be noted that a recipient e-mail address verify screen may be brought up on display by pressing the help button at this time. The user is able to verify the recipient e-mail address he has entered by checking the recipient e-mail address verify screen. Through this process, the nickname and e-mail address of the newly added recipient are registered in the electronic camera 1. Once the registration is completed, the operation returns to step S211 to bring up on display the recipient selection screen.

It is to be noted that recipient information may be registered in the electronic camera 1 with timing other than that of the step S213 described above. Namely, the user is able to register recipient information with any timing by, for instance, selecting recipient information registration in the setup menu. As an alternative, the electronic camera 1 may be connected to a PC and a recipient's nickname and e-mail address entered at the PC may be registered in the electronic camera 1, instead of directly entering the recipient's nickname and e-mail address at the electronic camera 1. This principle applies to the sender information registered in step S202 as well as the recipient information. Namely, the user is able to register sender information with any timing and to register a sender's nickname and e-mail address entered at a PC connected to the electronic camera 1.

In step S214, a decision is made as to whether or not to erase any of the existing recipient information registered in the electronic camera. If the delete button is pressed in the recipient selection screen brought up on display in step S211, a recipient information erase verify screen is brought up on display. If "yes" is selected in this screen, it is judged that the recipient information over which the cursor is placed in the recipient selection screen is to be erased and the operation proceeds to step S215. After the recipient information is erased in step S215, the operation returns to step S211 to display the recipient selection screen. If it is decided that no recipient information is to be erased, the operation proceeds to step S216.

In step S216, a decision is made as to whether or not any recipient has been selected in the recipient selection screen brought up on display in step S211. Until the user selects specific recipient information, the operation repeatedly returns to step S211 to hold the recipient selection screen on display and once recipient information corresponding to a specific recipient has been selected, the operation proceeds to step S217. In step S217, a transmission verify screen is brought up on display.

If "yes" is selected in the transmission verify screen brought up in step S217, it is decided in the following step S218 that the transmission has been confirmed to go ahead and the operation proceeds to step S219. In step S219, the image transfer processing shown in the flowchart presented in FIG. 18 is executed as explained earlier. Through the image transfer processing, the electronic camera 1 becomes connected to the mail transmission server 35 via the wireless LAN and each image determined to have been selected by the user in step S208 is transferred from the electronic camera 1 to the mail transmission server 35. At this time, the recipient information determined to have been selected in step S216 and the sender information having been registered by the user in the electronic camera 1 as explained earlier, i.e., the sender's nickname and e-mail address, too, are transmitted together with the transfer target image. Once step S219 has been executed, the processing in the flowchart presented in FIG. 19 ends. If "no" is selected in the transmission verify screen brought up in step S217, it is decided in the following step S218 that the transmission has not been approved to go ahead and, in this case, the processing in the flowchart presented in FIG. 19 ends without executing step S219. In this situation, no image transfer is executed.

(Resuming Image Transfer)

Figure 20:
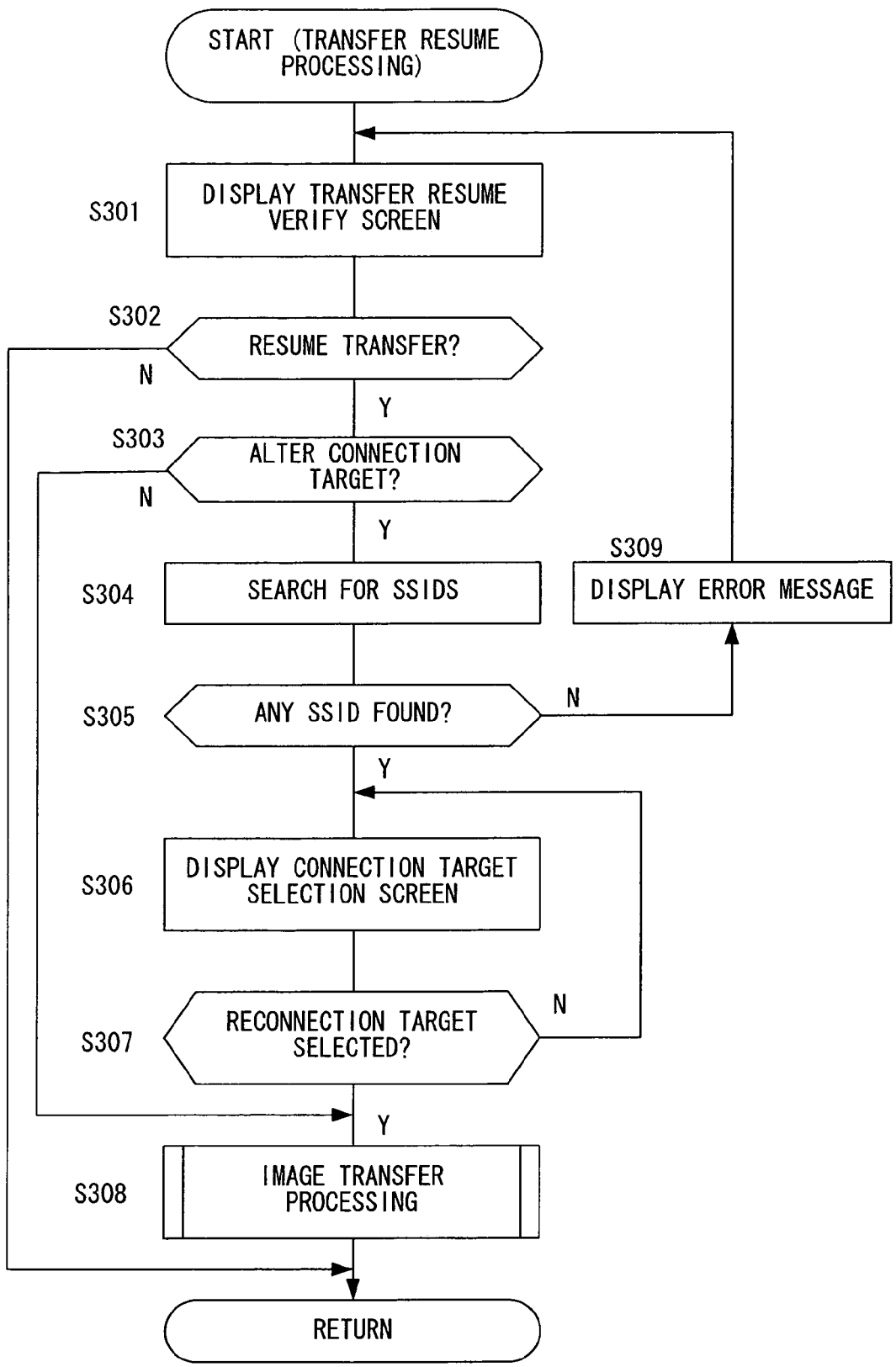

Next, the transfer resume processing executed in step S15 in FIG. 16 is described in reference to the flowchart presented in FIG. 20. In step S301 in FIG. 20, a transfer resume verify screen is brought up on display at the liquid crystal display unit 21 to verify with the user that the transfer is to resume.

If "yes" is selected in the transfer resume verify screen brought upon display in step S301, it is decided in the following step S302 that the transfer is to resume and in step S303 it is further decided that the connection target is to remain unaltered. The operation then proceeds to step S308 to execute image transfer processing as shown in the flowchart presented in FIG. 18 to transfer any transfer target images that the previous image transfer processing session failed to transfer. At this time, the electronic camera 1 is connected to the same connection target as the connection target for the previous image transfer processing session. As a result, any transfer target images that have not been transferred through the previous session are transferred. Once step S308 has been executed, the processing in the flowchart presented in FIG. 20 ends.

If "no" is selected in the transfer resume verify screen brought up on display in step S301, it is decided in step S302 that the transfer is not to resume. In this case, the processing in the flowchart presented in FIG. 6 ends without executing step S308. As a result, an image transfer of the target images not transferred through the previous transfer processing session is not executed.

In addition, if "change connection target" is selected in the transfer resume verify screen brought up in step S301, it is decided in the following step S302 that the transfer is to resume and it is further decided in step S303 that the connection target is to be switched. In this case, the operation proceeds to step S304 to search for SSIDs corresponding to connection targets capable of carrying out wireless LAN communication with the wireless LAN module unit 24, as in step S6 in FIG. 16.

In step S305, a decision is made as to whether or not any SSID has been found through the SSID search executed in step S304. If it is decided that no SSID corresponding to a selectable connection target device has been found through the search, the operation proceeds to step S309. In this case, an error message is brought up on display at the liquid crystal display unit 21 in step S309, and then the operation returns to step S301 to bring up the transfer resume verify screen again. If it is decided that at least one SSID has been found through the search, the operation proceeds to step S306.

In step S306, a connection target selection screen listing all the SSIDs determined to have been found through the search in step S305 is brought up on display at the liquid crystal display unit 21. In the following step S307, a decision is made as to whether or not the user has selected an SSID listed in the connection target selection screen having been brought up in step S306 to specify a reconnection target for the electronic camera 1. Until a reconnection target is selected, the operation repeatedly returns to step S306 to hold the connection target selection screen on display and once a reconnection target has been selected, the operation proceeds to step S308.

In step S308, the image transfer processing shown in the flowchart presented in FIG. 18 is executed to transfer any transfer target images that the previous image transfer processing session failed to transfer. At this time, the electronic camera 1 is connected to the reconnection target determined to have been selected in step S307. As a result, any transfer target images that were not transferred through the previous session are transferred. Once step S308 has been executed, the processing in the flowchart presented in FIG. 20 ends. As the transfer resume processing is executed as described above, the image transfer having been interrupted previously is resumed and all the transfer target images that have not been transferred through the previous transfer session are transferred.

(Operation at the Online Album Server)

Figure 21:
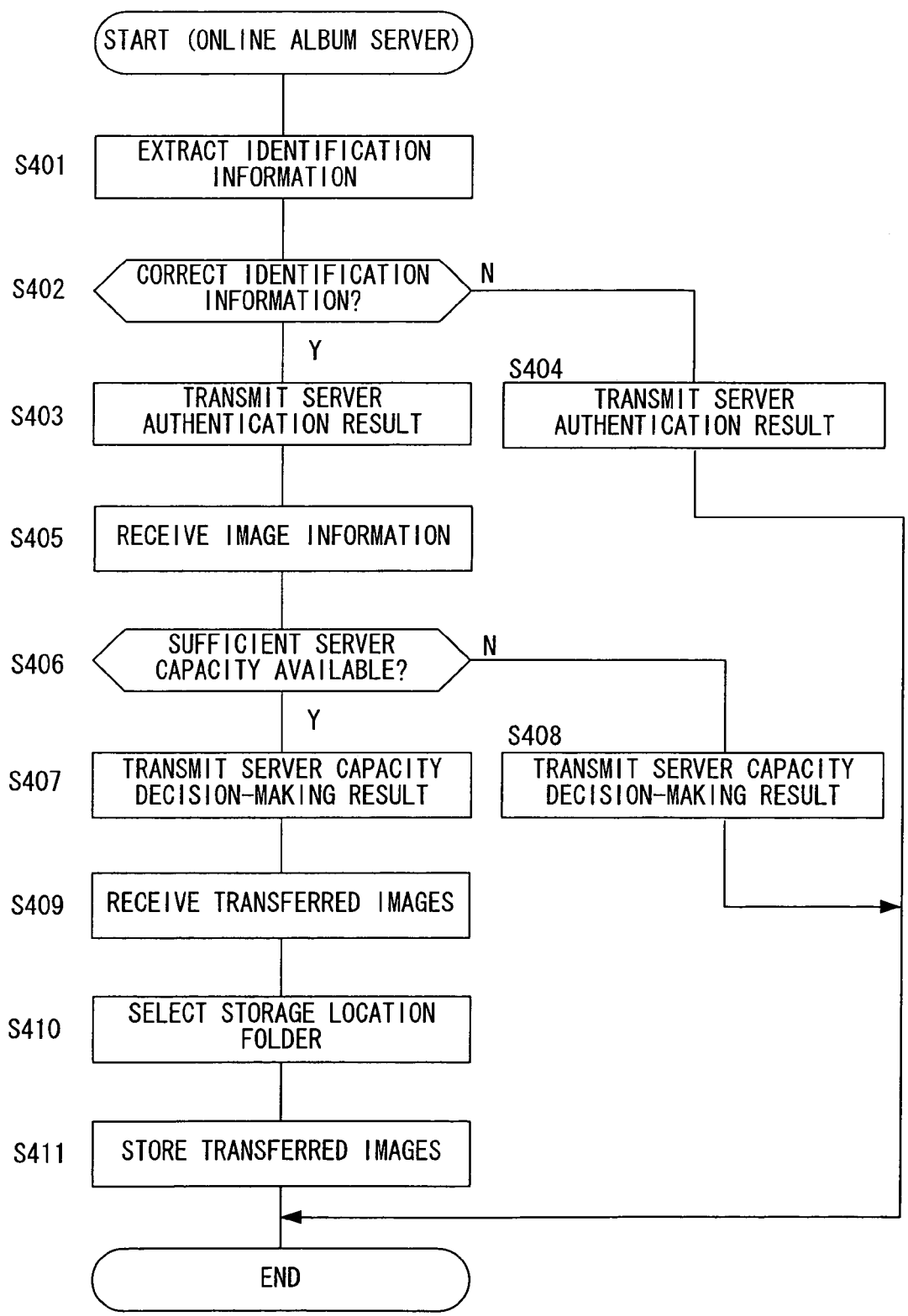

Next, the operation executed at the online album server 34 is described. FIG. 21 presents a flowchart of the processing executed at the online album server 34 during an image transfer from the electronic camera 1 to the online album server 34. In step S401, the identification information set in "User Agent" in the HTTP request message transmitted from the electronic camera 1 is extracted. This identification information is the identification information generated in step S128 in FIG. 18.

In step S402, server authentication is executed to determine whether or not the identification information extracted in step S401 belongs to an authorized user. More specifically, the following processing is executed as the server authentication. Information matching the related information 60, the identification information generation rules 61 and the key 62 stored in the memory 18 at the electronic camera 1 is stored in the memory of the online album server 34 and the online album server 34 decrypts the information to authenticate the identification information. The online album server likewise decrypts identification information having been processed (e.g., encrypted), in conformance to the identification information generation rules 61. As an alternative, the server may hold a list of sets of identification information generated in advance for all the service subscriber cameras in conformance to generation rules identical to those adopted in the electronic cameras by using the related information 60, the identification information generation rules 61 and the keys 62 in the electronic cameras 1, which are also stored in the server memory, and may search through the list for identification information matching the identification information extracted in step S401. If an online album is registered at the server in correspondence to the user of the electronic camera 1 identified based upon the identification information through any of the methods described above, the identification information is judged to belong to an authorized user, whereas if such online album registration has not been completed, the identification information is judged to belong to an unauthorized user. If the result of the server authentication indicates that the identification information extracted in step S401 is approved, the operation proceeds to step S403, whereas if the identification information is not approved, the operation proceeds to step S404.

In step S403 or step S404, the result of the decision made in step S402 is transmitted to the electronic camera 1 as a server authentication result. Namely, in step S403, to which the operation proceeds after making an affirmative decision in step S402, the server authentication result OK is transmitted to the electronic camera 1. In this case, after transmitting the server authentication result, the operation proceeds to step S405. If the operation proceeds from step S402 to step S404, the server authentication result NG is transmitted to the electronic camera 1. In this situation, once the server authentication result is transmitted, the processing in the flowchart presented in FIG. 21 ends. Accordingly, if the operation proceeds from step S402 to step S404, no image transfer from the electronic camera 1 to the online album server 34 is executed.

In step S405, image information originating from the electronic camera 1 is received. This image information is the image information transmitted from the electronic camera 1 in step S131 in FIG. 18, indicating the number of images to be transferred, the transmission size and the like. In the following step S406, a decision is made as to whether or not sufficient server capacity is available based upon the image information received in step S405. If it is decided that sufficient server capacity is available, the operation proceeds to step S407, whereas if it is decided that sufficient server capacity is not available, the operation proceeds to step S408.

In step S407 or step S408, the server capacity decision-making result corresponding to the decision having been made in step S406 is transmitted to the electronic camera 1. Namely, if the operation has proceeded from step S406 to step S407, the electronic camera 1 is informed that sufficient server capacity is available. In this case, upon transmitting the server capacity decision-making result, the operation proceeds to step S409. If the operation has proceeded from step S406 to step S408, the electronic camera 1 is informed that sufficient server capacity is not available. In this situation, the processing in the flowchart presented in FIG. 21 ends upon transmitting the server capacity decision-making result. This means that if the operation proceeds from step S406 to step S408, no image transfer from the electronic camera 1 to the online album server 34 is executed.

In step S409, images transferred from the electronic camera 1 are received. These images are those transferred from the electronic camera 1 in step S134 in FIG. 18. In the following step S410, a target folder where the images received in step S409 are to be accumulated is selected. The target folder is selected from a plurality of folders set in the online album registered in correspondence to the user of the image sender electronic camera 1 in the embodiment. For instance, the user may have designated one of the folders in advance as the image storage location and in such a case, this folder is selected as the target folder. In the initial state, in which no image storage location has been designated by the user, a default folder set as the initial folder is selected as the target folder.

It is desirable that the initial folder be a private folder so that images stored therein are not available for viewing by parties other than the user, so as to ensure that no image in the folder is viewed by strangers without the user's approval. When the user designates in advance a specific folder to be used as the image storage location, the user should be able to choose whether or not to make images stored in the folder available for public viewing. In this case, the user is allowed to determine whether or not to make his images available for viewing by the public.

In step S411, the images received in step S409 are stored into the target folder selected in step S410. Through this process, the images transferred from the electronic camera 1 are stored into one of the plurality of folders set in the user's online album. The stored images may be posted on the Internet or further processed by the user by accessing the online album server 34 via a PC or the like. Once step S411 has been executed, the processing in the flowchart presented in FIG. 21 ends.

As the processing described above is executed at the online album server 34, images having been photographed with the electronic camera 1 are transferred to the online album server 34 and the transferred images are stored into the online album registered to the user.

(Operation at the Mail Transmission Server)

Figure 22:
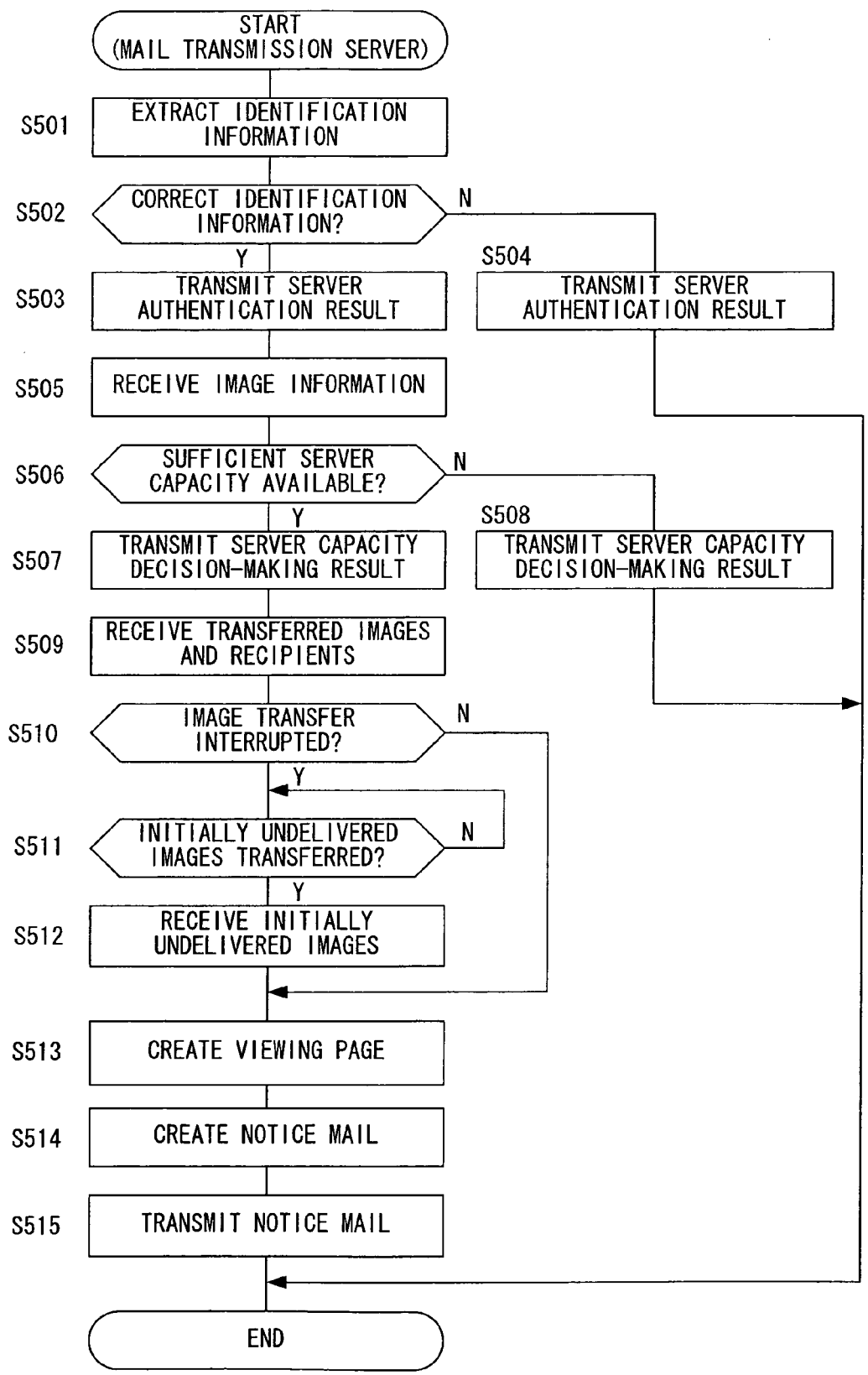

Next, the operation executed at the mail transmission server 35 is described. FIG. 22 presents a flowchart of the processing executed at the mail transmission server 35 during an image transfer from the electronic camera 1 to the mail transmission server 35. In steps S501~S508 in the flowchart, processing similar to that executed in steps S401~S408 in FIG. 21 is executed. Accordingly, a detailed explanation of this processing is not provided.

In step S509, the images and the recipient information transferred from the electronic camera 1 are received. The images received in this step are those transferred from the electronic camera 1 in step S134 in FIG. 18 and the recipient information is transmitted from the electronic camera 1 together with the transfer target images. In the following step S510, a decision is made as to whether or not the image transfer from the electronic camera 1 has been interrupted. If it is decided that the image transfer has been interrupted, the operation proceeds to step S511. If all the transfer target images have been transferred without interruption, the operation proceeds to step S513. Thus, a decision is made in step S510 as to whether or not an interruption of the image transfer from the electronic camera 1 has been detected.

In step S511, the image transfer is resumed at the electronic camera 1 and a decision is made as to whether or not any transfer target image that has not been transferred through the initial image transfer (initially undelivered image) due to the interruption detected in step S510, has been transferred from the electronic camera 1. Until all initially undelivered images are transferred, the operation remains in step S511 and then the operation proceeds to the following step S512. Thus, if an interruption in the image transfer is detected in step S510, the processing in step S514 to be detailed later is not executed until the initially undelivered images have been transferred, so as to suspend the creation of a notice mail. Then, only after all the initially undelivered images have been transferred, the suspension on the creation of the notice mail is cleared. In step S512, the initially undelivered images transferred from the electronic camera 1 are received.

In step S513, a webpage in which the images transferred from the electronic camera 1 are to be posted for viewing is created based upon the images received in step S509. If any initially undelivered images have been received in step S512, the webpage is created so as to include the initially undelivered images as well. In the webpage, an at-a-glance display of thumbnail images generated by reducing the individual images transferred from the electronic camera 1 is provided. A viewer clicks a specific thumbnail image to display the corresponding image in an enlargement or to download the corresponding image. It is to be noted that the webpage created in this step is erased once the service period explained earlier expires.

In step S514, a notice mail to be used to invite people other than the user of the electronic camera 1 to visit the webpage created in step S513, is generated. This notice mail includes link information providing a link to the webpage. The notice mail may further include in an attachment the thumbnail images generated by reducing the images having been transferred from the electronic camera 1 or include link information providing a link to a thumbnail image display. It is to be noted that if the number of images transferred from the electronic camera exceeds a predetermined value, the notice mail may include the thumbnail images of only some of the images selected from the images transferred from the electronic camera. For instance, if up to three thumbnail images may be attached to the notice mail and more than three images have been transferred from the electronic camera 1, the notice mail may include in an attachment three selected thumbnail images corresponding to three images selected from the images transferred from the electronic camera or may include link information providing a link to a display of the three thumbnail images. Under such circumstances, the images corresponding to the thumbnail images to be attached to the notice mail may be selected based upon, for instance, the chronological order in which the individual images have been photographed with the electronic camera 1. For instance, the three images having been photographed first may be selected and their thumbnail images may be attached to the notice mail or link information providing a link to a display of these thumbnail images may be added in the notice mail.

In step S515, the notice mail having been created in step S514 is transmitted to each e-mail address specified in the recipient information received from the electronic camera 1 in step S509. Through this process, the notice mail is transmitted to the recipients selected by the user of the electronic camera 1 as explained earlier. Once step S511 has been executed, the processing in the flowchart presented in FIG. 22 ends.

As the processing described above is executed at the mail transmission server 35, images photographed with the electronic camera 1 are transferred to the mail transmission server 35, which then creates a webpage for posting the received images. Subsequently, a notice mail inviting people to view the transferred images is transmitted to the specified e-mail addresses.

It is to be noted that the webpage created in step S513, as described above, includes information indicating the e-mail address of the user of the electronic camera 1, from which the images have been transferred. By disclosing the e-mail address of the user, any abusive use of the mail transmission service may be prevented. Such abusive use of the mail transmission service includes, for instance, posting obscene or offensive images. It is to be noted that the users e-mail address, preregistered in the electronic cameral, as explained earlier, is transmitted to the mail transmission server when images are transferred from the electronic camera 1 to the mail transmission server.

The embodiment described above is simply provided as an example and the present invention allows for various other embodiments as long as the features characterizing the present invention are not compromised.

The disclosure of the following priority application is herein incorporated by reference:
Japanese Patent Application No. 2006-355915 filed Dec. 28, 2006

The invention claimed is:
1. An image transfer system comprising:
a first specific server including first data;
a second specific server including second data; and
an electronic camera having a function of accessing the first specific server and the second specific server via the Internet, wherein:
the electronic camera comprises:
a storage unit in which related information concerning the electronic camera is stored in advance of accessing the first specific server and the second specific server;
a first generation unit that generates a first identifier to be used to identify the electronic camera in conformance to a first predefined specific rule based upon at least part of the related information stored in the storage unit;
a first setting unit that sets the first identifier generated by the first generation unit within a first request message, which is to be received by the first specific server, for connecting to the Internet;
a second generation unit that generates a second identifier to be used to identify the electronic camera in conformance to a second predefined specific rule based upon at least part of the related information stored in the storage unit;
a second setting unit that sets the second identifier generated by the second generation unit within a second request message for server authentication by the second specific server; and
a memory unit in which an image captured is stored, wherein:
the electronic camera (1) connects to the Internet in accordance with receiving from the first specific server a first authentication response indicating that access to the first specific server by the electronic camera is accepted and (2) transmits the image to the second specific server in accordance with receiving from the second specific server a second authentication response indicating that access to the second specific server by the electronic camera is accepted;
the first authentication response is transmitted by the first specific server when the first specific server determines that the first identifier matches the first data;
the second authentication response is transmitted by the second specific server when the second specific server judges that the second identifier corresponds to the second data; and
the related information includes manufacturer information indicating a manufacturer of the electronic camera, product information of the electronic camera and a serial number assigned to the electronic camera.
2. An image transfer system according to claim 1, wherein:
provided that the second specific server offers a service set in correspondence to a user of the electronic camera, the second identifier is identification information used by the second specific server to identify the electronic camera of the user as a specific device.
3. An image transfer system according to claim 2, wherein:
provided that the second specific server is an image management server where images are stored, the electronic camera includes a display unit that outputs a screen display in which an image to be transferred to the second specific server is selected.
4. An image transfer system according to claim 2, wherein:
the electronic camera includes a communication unit engaged in wireless communication with an access point in a wireless LAN, and
the electronic camera is connected to the Internet via the access point in communication with the communication unit.
5. An image transfer system according to claim 2, wherein:
the related information includes manufacturer information indicating a manufacturer of the electronic camera, product information of the electronic camera and a serial number assigned to the electronic camera.
6. An image transfer system according to claim 5, wherein:
the identification information generated by the second generation unit includes information obtained through a specific type of encryption processing executed on at least part of the manufacturer information, the product information and the serial number appended with a predetermined specific key.

7. An image transfer system according to claim 6, wherein:
the encryption processing is executed by using a specific hash function.

8. An image transfer system according to claim 2, wherein:
the identification information is written within the request message as a "User Agent" defined in HTTP.

9. An image transfer system according to claim 1, wherein:
the first identifier used when accessing the second specific server after undergoing an authentication process at the first specific server is constituted with a user ID and a password used in the authentication process at the first specific server.

10. An image transfer system according to claim 9, wherein:
provided that the second specific server is an image management server where images are stored, the electronic camera includes a display unit that outputs a screen display in which an image to be transferred to the second specific server is selected.

11. An image transfer system according to claim 9, wherein:
the electronic camera includes a communication unit engaged in wireless communication with an access point in a wireless LAN, and the electronic camera is connected to the Internet via the access point in communication with the communication unit.

12. An image transfer system according to claim 9, wherein:
the first generation unit generates the user ID based upon at least part of the manufacturer information, the product information and the serial number and generates the password constituted with information generated through a specific type of encryption processing executed on at least part of the manufacturer information, the product information and the serial number appended with a predetermined specific key.

13. An image transfer system according to claim 12, wherein:
the encryption processing is executed by using a specific hash function.

14. An image transfer system according to claim 9, wherein:
the user ID and the password are written in the request message in conformance to international roaming standard WISPr.

* * * * *